(12) United States Patent
Wesemann et al.

(10) Patent No.: US 9,870,860 B2
(45) Date of Patent: Jan. 16, 2018

(54) SYSTEM FOR SUPPLYING BUS SUBSCRIBER MODULES WITH CONTACTLESS ENERGY AND DATA

(71) Applicant: Weidmueller Interface GmbH & Co. KG, Detmold (DE)

(72) Inventors: Derk Wesemann, Lemgo (DE); Stefan Witte, Minden (DE); Jan Stefan Michels, Paderbon (DE); Bjoern Griese, Paderbon (DE); Mathias Soellner, Waldsassen (DE); Hans-Peter Schmidt, Ottensoos (DE)

(73) Assignee: Weidmüller Interface GmbH & Co. KG (DE)

( * ) Notice: Subject to any disclaimer, the term of this patent is extended or adjusted under 35 U.S.C. 154(b) by 302 days.

(21) Appl. No.: 14/649,856

(22) Filed: Jun. 4, 2015

(65) Prior Publication Data

US 2015/0348703 A1 Dec. 3, 2015
US 2017/0011845 A9 Jan. 12, 2017

Related U.S. Application Data

(63) Continuation of application No. 13/264,928, filed as application No. PCT/EP2010/055600 on Apr. 27, 2010, now Pat. No. 9,099,880.

(30) Foreign Application Priority Data

Apr. 29, 2009 (DE) .................. 10 2009 003 846

(51) Int. Cl.
*H01F 27/42* (2006.01)
*H01F 37/00* (2006.01)
(Continued)

(52) U.S. Cl.
CPC ............ *H01F 38/14* (2013.01); *G06F 13/00* (2013.01); *H02J 50/05* (2016.02); *H02J 50/12* (2016.02);
(Continued)

(58) Field of Classification Search
CPC . H02J 5/005; H02J 7/025; H02J 17/00; H01F 38/14; B60L 11/182; H01R 9/2675;
(Continued)

(56) References Cited

U.S. PATENT DOCUMENTS 6,347,252 B1 * 2/2002 Behr .................. G05B 19/4185
700/2
7,317,793 B2 * 1/2008 Binder .................... H04M 9/08
379/413

(Continued)

FOREIGN PATENT DOCUMENTS

DE 19640367 A1 4/1998
DE 29624219 U1 4/2001
(Continued)

Primary Examiner — Rexford Barnie
Assistant Examiner — Jagdeep Dhillon
(74) Attorney, Agent, or Firm — Laubscher, Spendlove & Laubscher, P.C.

(57) ABSTRACT

A supply system for supplying in a contact-free manner electrical energy and data signals to a subscriber module, including a support member, a supply bar mounted on the support member, which supply bar supports primary energy and data interfaces, and at least one bus subscriber module mounted on the support member, which bus subscriber module includes secondary energy and data interfaces arranged adjacent and spaced from the primary energy and data interfaces, respectively, whereby electrical energy and data signals supplied to the primary interfaces are transmitted in a contact-free manner to the secondary interfaces, respectively. Preferably the support member is a mounting rail having an inverted top-hat configuration, with the supply (Continued)

bar being mounted longitudinally in the space defined by the horizontal bottom and vertical side walls of the mounting rail.

3 Claims, 28 Drawing Sheets

(51) Int. Cl.
*H01F 38/00* (2006.01)
*H01F 38/14* (2006.01)
*G06F 13/00* (2006.01)
*H04B 5/00* (2006.01)
*H02J 50/05* (2016.01)
*H02J 50/40* (2016.01)
*H02J 50/12* (2016.01)
*H04L 29/06* (2006.01)

(52) U.S. Cl.
CPC ............ *H02J 50/40* (2016.02); *H04B 5/0012* (2013.01); *H04B 5/0031* (2013.01); *H04B 5/0037* (2013.01); *H04B 5/0075* (2013.01); *H04L 65/102* (2013.01)

(58) Field of Classification Search
CPC .......... H01R 9/00; G06K 7/0095; G06K 7/00; H04M 19/08; H04M 19/06; H04M 19/00; G06F 13/00; G06F 13/10; G06F 13/20; H04L 12/28; H04L 12/14; G05B 19/18; G05B 19/00

USPC ............. 307/104, 149, 80, 82, 17, 2, 66, 64; 361/600, 729, 736, 727; 710/300; 235/375, 439, 377; 370/257, 255, 253; 379/415, 414
See application file for complete search history.

(56) References Cited

U.S. PATENT DOCUMENTS

| | | |
|---|---|---|
| 7,445,487 B1 | 11/2008 | Guethoff |
| 7,658,653 B2 | 2/2010 | Diekmann |
| 7,865,648 B2 * | 1/2011 | Kuschke ............. H01R 9/2675 361/729 |
| 2001/0024888 A1 | 9/2001 | Marketkar |
| 2007/0008908 A1 * | 1/2007 | Rainer .................. H04L 12/417 370/257 |
| 2009/0314829 A1 * | 12/2009 | McAllistor .......... G06K 7/0095 235/375 |

FOREIGN PATENT DOCUMENTS

| | | |
|---|---|---|
| DE | 10026174 A1 | 10/2001 |
| DE | 10203765 A1 | 8/2003 |
| DE | 10203765 B4 | 8/2003 |
| DE | 102007061610 A1 | 7/2009 |
| EP | 1885085 A1 | 2/2008 |
| EP | 2073315 A2 | 6/2009 |

* cited by examiner

SYSTEM FOR SUPPLYING BUS SUBSCRIBER MODULES WITH CONTACTLESS ENERGY AND DATA

REFERENCE TO RELATED APPLICATIONS

This application is a continuation of U.S. application Ser. No. 13/264,928 filed Oct. 17, 2011, which was a national stage application under 35 U.S.C. 371 of International Application No. PCT/EP2010/055600 filed Apr. 27, 2010, claiming priority of the German application No. 10 2009 003 846.9 filed Apr. 29, 2009.

BACKGROUND OF THE INVENTION

Field of the Invention

A supply system for supplying electrical energy and data signals to a subscriber module in a contact-free manner, including a support member, a supply bar mounted on the support member, which supply bar supports primary energy and data interfaces, and at least one bus subscriber module mounted on the support member, which bus subscriber module includes secondary energy and data interfaces arranged adjacent and spaced from the primary energy and data interfaces, respectively, whereby electrical energy and data signals supplied to the primary interfaces are transmitted in a contact-free manner to the secondary interfaces, respectively.

Description of Related Art

As shown by the patents to Guethoff et al U.S. Pat. No. 7,445,487 and Diekmann et al U.S. Pat. No. 7,658,653, among others, it is know in the prior art to mount terminal blocks on U-shaped mounting rails.

It is also known that by means of electromagnetic induction, one can, together or separately and in a contactless manner, transmit communications signals and possibly also electrical energy from a transmitter unit to a receiver unit. According to a particular variant, this involves an inductive transfer with the help of a high-frequency magnetic field from a primary coil (transmitter) to a secondary coil (receiver). It is furthermore also known that one can transmit electrical energy and data in a capacitive manner between two switching circuits. The capacitive coupling, which depends heavily on the distance, grows along with the rising frequency.

Such systems are known in the prior art, as evidenced by the German patents No. DE 102 03 765 B4, and DE 100 26 174 A1, and the U.S. published application No. US 2001/0024888A1, which are cited for technological background.

In the European patent No. EP 1 885 085 A1, it is proposed to supply electrical energy to the bus subscriber modules of a data bus in a contactless manner by means of inductive transmission and in this manner to transmit data. The solution proposed by this reference is too little flexible inasmuch as it requires that the bus subscribers and the pertinent assembly base be assembled at precisely mutually coordinated plug-in sites. But in this way, it is, however, only possible to couple the electronic housings of a predetermined structural width with the assembly base. That predetermines fixed catch points and that constitutes yet another problem. Solving this problem is a primary object of the present invention.

SUMMARY OF THE INVENTION

A supply system for supplying electrical energy and data signals to a subscriber module in a contact-free manner, including a support member, a supply bar mounted on the support member, which supply bar supports primary energy and data interfaces, and at least one bus subscriber module mounted on the support member, which bus subscriber module includes secondary energy and data interfaces arranged adjacent and spaced from the primary energy and data interfaces, respectively, whereby electrical energy and data signals supplied to the primary interfaces are transmitted in a contact-free manner to the secondary interfaces, respectively. Preferably the support member is a mounting rail having an inverted top-hat configuration, with the supply bar being mounted longitudinally in the space defined by the horizontal bottom and vertical side walls of the mounting rail.

Accordingly, it a system is provided for the contactless data and energy supply of bus subscriber modules that can be lined up one against the other on an assembly base, whereby the assembly base has at least one energy transmission interface and a data transmission interface, preferably made separately but also conceivable as an integrated interface, and where the bus subscriber modules in each case have a corresponding energy transmission interface and a corresponding data transmission interface, whereby an advantageous supply bar is provided, which displays the energy transmission interface and the data transmission interface.

In a particularly preferred and advantageous manner, the assembly base is made as a supply bar that extends along the main longitudinal direction of the mounting rail, which supply bar displays the energy transmission interface and the data transmission interface.

In this way, an optimized system is created with a slightly structural part expenditure, where an assembly bar - - - specifically, a mounting rail - - - is used by means of a supplementary supply bar of the kind described for contactless data and energy transmission.

As an alternative, it is also conceivable that one might mount the system on an assembly plate or that one might use the supply bar directly in order to mount the units on it.

The invention can be implemented in a particularly simple and inexpensive fashion in that the mounting rail is made as a bus bar with a hat-shaped cross-section on which one can arrest the bus subscriber modules and where one can preferably also line them up against each other in a grid-free manner and which has a free space, whereby the supply bar is at least partly integrated, preferably inserted, into the free space. Here it is conceivable that one might prefabricate the supply bar as a separate element and fix it as a whole on the mounting rail as a, so to speak, preassembled unit; in particular, one could glue it into the free space of the mounting rail and/or one could lock it in there and/or one could clamp it in there and/or one could screw it in there.

The mounting rail, or a bus rail in the mounting rail, is not contacted by moved parts; therefore, the failure safety - - - in particular, when only passive structural elements are present in the rail - - - is relatively great and the wear and tear is relatively small.

The mounting rail is basically suited for free positioning of the modules that are attached thereto. It is particularly advantageous when the bus subscriber modules are also freely positioned on the mounting rail in the main longitudinal direction and in a grid-free manner because this design makes the system particularly flexible.

Depending on the layout, as a capacitive or inductive system, the supply bar can have a basic body upon which are placed at least one or several strip conductors for the purpose of capacitive coupling, or a basic body upon which are placed at least one or several coils for the purpose of inductive coupling. Also, a mixed form could be provided, wherein the energy transmission can take place capacitively or inductively, and the data transmission can take place accordingly in a manner other than inductively or capacitively. With these variants, one may inductively or capacitively select the particular transmission form that would fit the particular task.

Preferably, energy transmission takes place inductively and data transmission takes place capacitively because these forms of transmission are particularly suitable in each case for these variants.

According to a further development of the invention, the bus subscriber modules have a recess in which engages a projection on the supply bar when in the mounted state on the mounting rail. The projection should then protrude over the free space of the mounting rail so that one can prevent the placement of modules that do not belong to the system according to the manner of a mechanical coding with a high degree of probability.

It is particularly advantageous when the primary-side inductivity (inductivities) of the energy transmission interface and/or the data transmission interface in each case are designed for energy and data transmission to several of the secondary-side inductivities of the bus subscriber modules. Here it is particularly advantageous when limitations, such as they result from the state of the art by the provided fixed plug-in grid for the bus subscriber modules, are eliminated. Instead, the bus subscriber modules can be freely positioned on the mounting rail. They can furthermore have a different width along the main extension direction of the mounting rail, and they can possibly have a different structural depth perpendicularly to the mounting rail. It is especially the inductive supply of several bus subscribers with energy that in this manner is particularly well implementable.

Alternatively, it is conceivable that the energy transmission interface and/or the data transmission interface in each case will have an electrode, in particular, a strip conductor, which is designed for capacitive energy and data transmission of several secondary-side electrodes of the bus subscriber modules. Here again, we get a particularly simple structure with the advantage of the possibility for the grid-free arrangement of the modules.

The invention also provides a method for the operation of a system which is distinguished by the fact that with the help of the control device, one can determine the number of the bus subscriber modules that are set upon the mounting rail on the basis of at least one determinable physical parameter in the course of energy and/or data transmission, and the system is regulated as a function of the number of the bus subscriber modules that are set upon the mounting rail. This method makes it possible, for instance, to adjust the system in an optimum fashion as a function of the number of bus participants. This, in other words, involves an advantageous further development of the invention, although it is not in every case compulsory.

It is furthermore possible to implement a method for the operation of a system according to one of the claims relating to the system, where with the help of the control device, one can determine the absolute site of the bus subscriber modules that are set upon the mounting rail, something that is particularly useful for address allocation.

Summarizing, the following inventive advantages are provided by the present invention:
a relatively free positioning of the functional modules on the mounting rail;
along with that, a reduced installation effort;
simple maintenance;
reduced wear and tear;
a simple possibility for implementing high protection classes;
one can determine additional information items, such as position and/or sequence of the bus subscriber modules;
one can use existing installation material;
there is the possibility of insertion on moveable objects.

Preferably, the number of modules per combination made up of Gateway module and series-connected energy and data transmission devices is no more than 30.

It is furthermore provided advantageously that the nominal output per bus subscriber module amounts to 0 to 20 W in the low-voltage range of <42 V, and that less than every 2 msec, preferably every "1 msec," a system image will be available on the Gateway module.

Here a modular structure for the supply bar is provided, where the data transmission may take place via cable, but where for purposes of energy supply, there is a separate feed per module, where both the data and the energy are transmitted via cable.

It is also conceivable that a separate coil/inductivity can be built up per module of the supply bar or that there is an individual inductivity for the entire supply bar, which extends over all modules.

Also conceivable is a contactless (capacitive/inductive) coupling between two supply modules in place of a transmission from module to module via cable. Furthermore, also conceivable is a contactless coupling between a Gateway/Generator and the supply bar.

BRIEF DESCRIPTION OF THE DRAWINGS

Other objects and advantages of the invention will become apparent from a study of the following specification, when viewed in the light of the accompanying drawing, in which:

FIG. 14b is a schematic diagram illustrating the interfaces of FIG. 14a;

DETAILED DESCRIPTION OF THE INVENTION

FIG. 1

Figure 1:
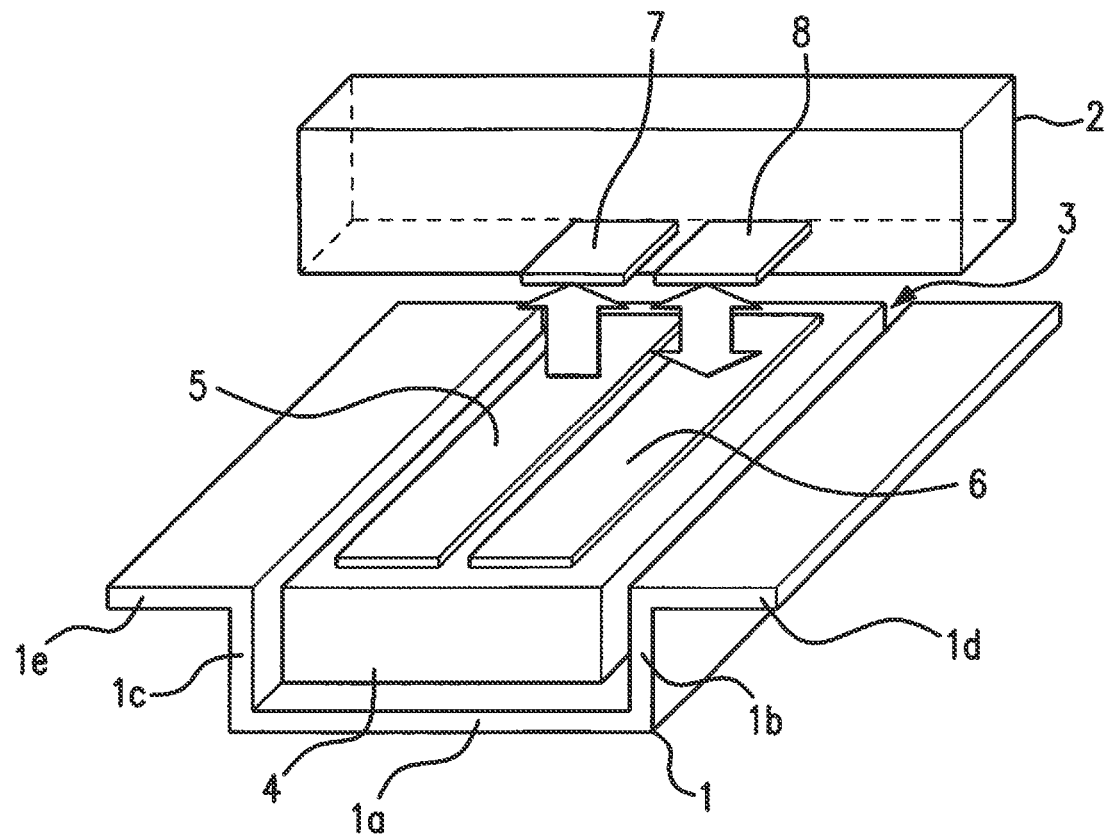
FIG. 1 is a perspective view illustrating the arrangement of the mounting rail, supply bar and bus subscriber components of the present invention.
Figure 1A:
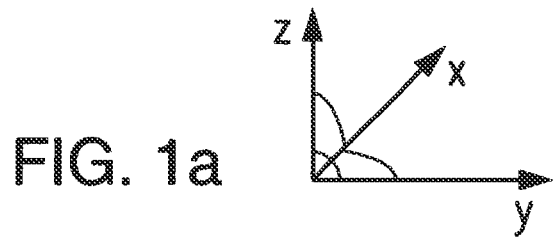
FIG. 1a is a vector diagram illustrating the axes of representation in FIG. 1.

Referring first to FIG. 1, the mounting rail 1 has a conventional inverted top-hat configuration including a horizontal base wall 1a, a pair of vertical side walls 1b and 1c, and a pair of horizontal coplanar outwardly-directed flange walls 1d and 1e. As is known in the art, the flange portions 1d, 1e are used for mounting on mounting rail 1, electronic housings, terminal blocks or the like, which for this purpose have as a rule corresponding catch feet (not illustrated here) which encompass the marginal legs 1d, 1e.

Various modules, such as bus subscriber modules 2, are mounted transversely against each other on the mounting rail 1 in the main longitudinal direction X. In the case at hand, the bus subscriber modules 2 are provided with electronic housings, which are designed for being locked in the manner of terminal blocks upon the marginal legs 1d, 1e of mounting rail 1 and which are lined up against each other on said mounting rail.

Figure 8:
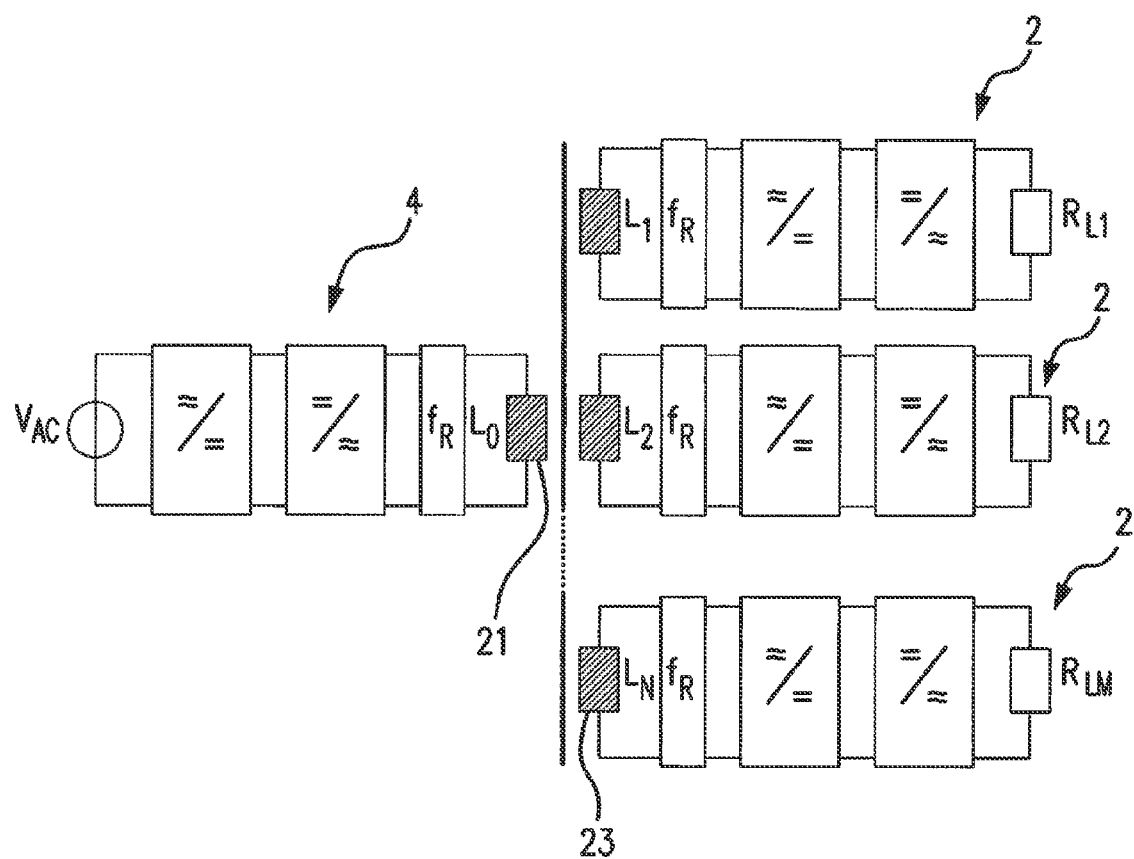
Figure 10:
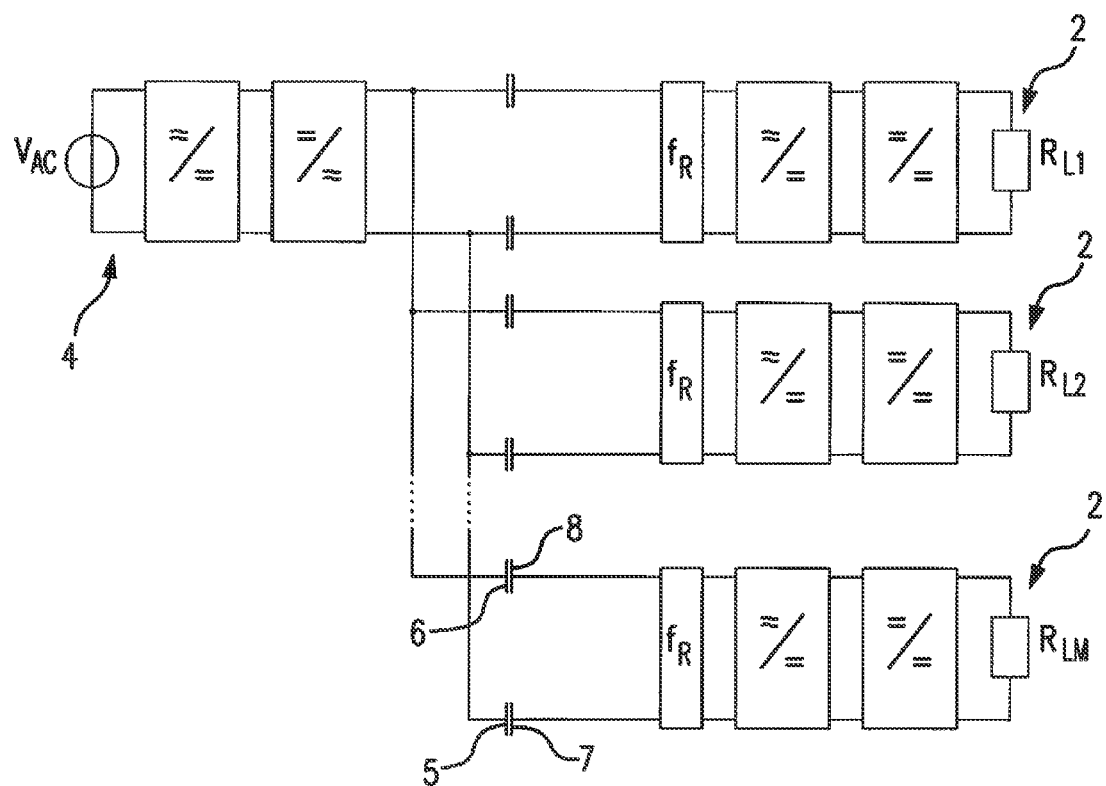

Arranged on mounting rail 1 in the free space 3 between base wall 1a and side walls 1b, 1c is at least one supply bar 4. Preferably, this supply bar 4 is adhesively secured or clamped into the free space 3. Supply bar 4 includes at least one capacitively or inductively coupled primary energy transmitting interface 5, and at least one capacitively or inductively coupled primary data signal transmitting interface 6 (as represented in FIGS. 8 and 10, respectively).

Preferably, the supply bar furthermore has a rather long base body, which is inserted longitudinally into space 3 and extends along the main direction of extent X of mounting rail 1, and upon which is arranged the capacitively or inductively coupled energy transmission interface 5, and at least one capacitively or inductively coupled data signal transmission interface 6.

Figure 2:
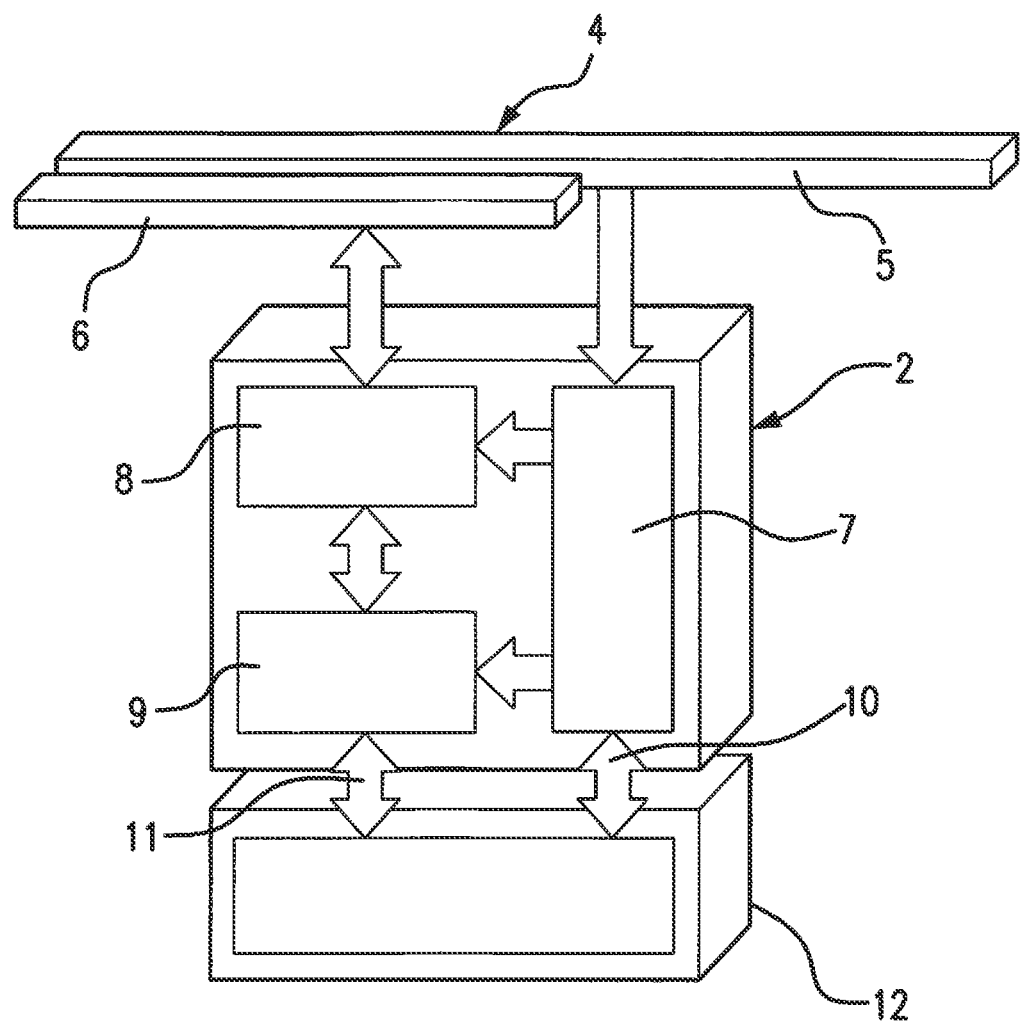
FIG. 2 is a schematic diagram illustrating the arrangement of the bus subscriber component of FIG. 1 as used in a conventional supply installation.
Figure 3:
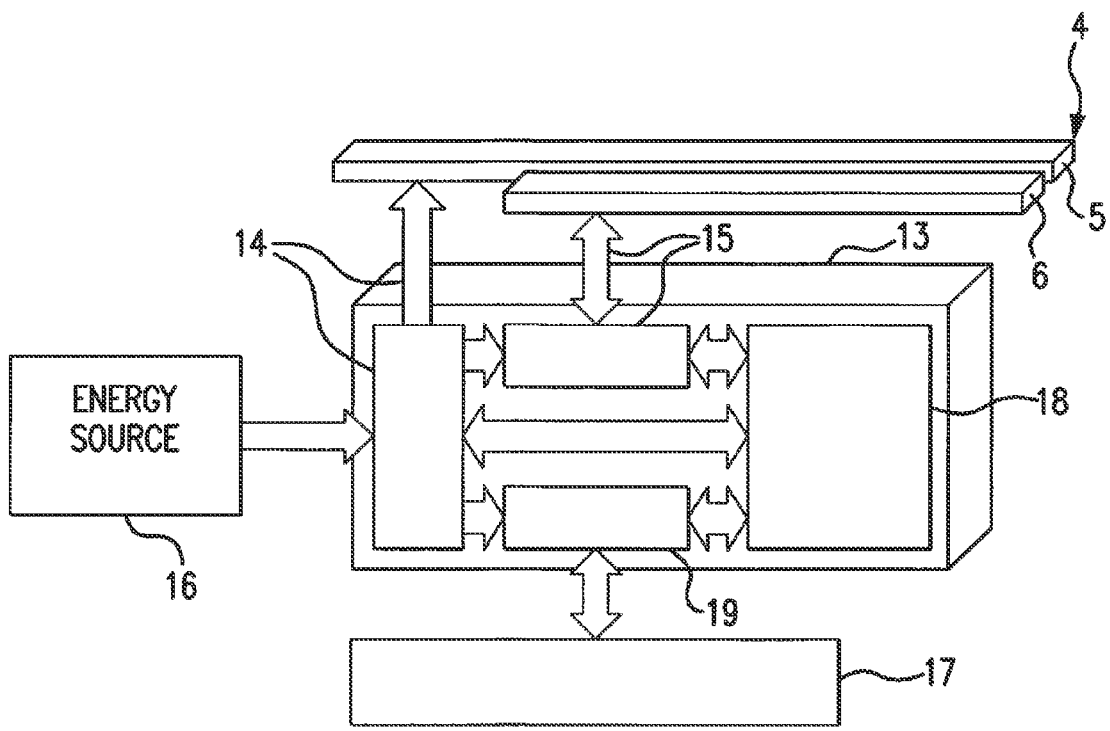
FIG. 3 is a schematic diagram of the contactless supply installation including the micro-control operation of a Gateway module in a bus subscriber installation.
Figure 4:
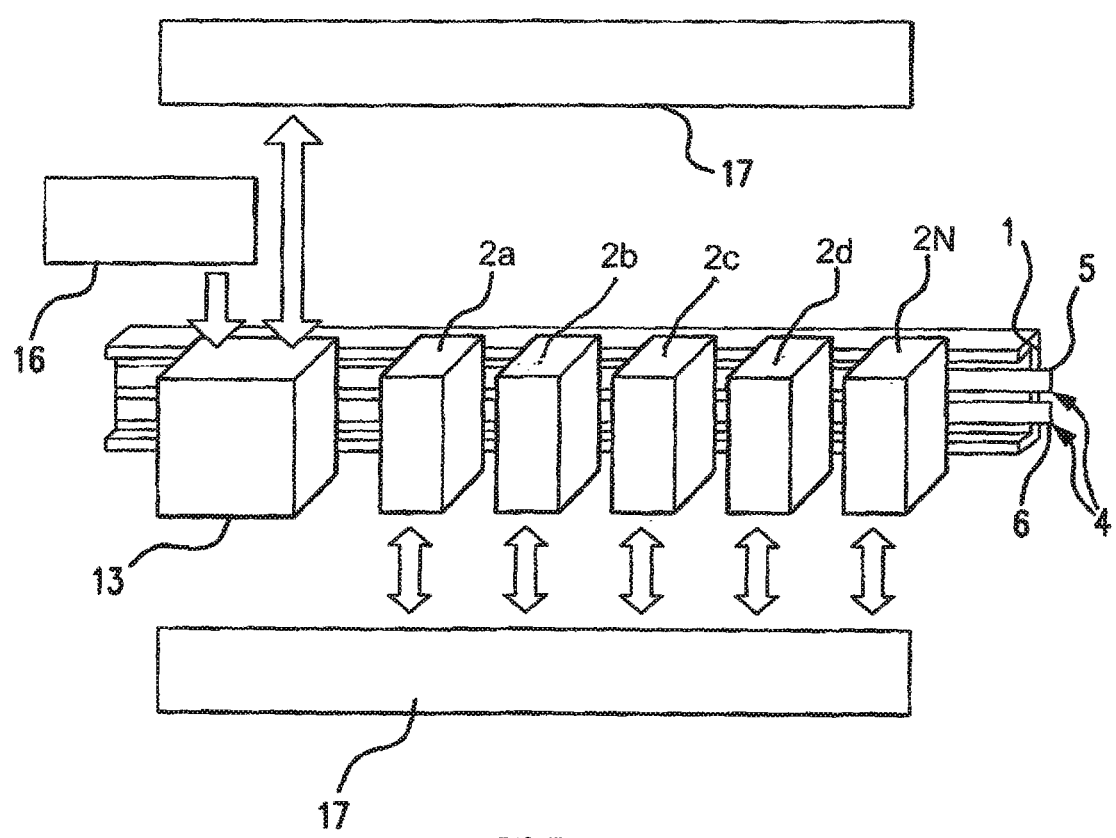
FIG. 4 is a schematic diagram of a contactless supply system according to the present invention including a plurality of bus subscriber components.

FIGS. 2 and 3

As shown in FIG. 2, the bus subscriber module 2 includes a secondary energy interface 7 coupled with the primary energy interface 5, a secondary data signal interface 8 coupled with the primary interface 6, and a microcontroller 9 that is connected with the secondary energy and data interfaces. The secondary energy interface 7 and the microcontroller 9 are connected by connections 10 and 11 with the subscriber's external field unit 12 (for example, an actuator, a sensor, or the like). Each bus subscriber module 2, according to FIG. 2, has a corresponding capacitively or inductively coupled energy transmitting interface 7, and a correspondingly capacitively or inductively coupled data transmitting interface 8. The interfaces 5 to 8 preferably are positioned opposite each other on the mutually facing sides of the supply bar 4 and the bus subscriber modules 2.

The external field units 12, such as actuators, sensors, initiators and the like, in particular, are connected via electrical or optical lines/cables in order to supply them with electrical energy and/or to transmit data to them, and/or to receive, and possibly process, data signals from them, and to transmit data signals back to a Gateway module 13 (FIG. 3). The bus subscriber modules 2 furthermore have at least the kind of electronics required to constitute a complete receiving unit and, if data signal are to be returned, a data transmitting unit.

Each bus subscriber module 2 furthermore is provided with a microcontroller 9, which is connected with the energy transmission interface 7 and the data transmission interface 8. Each bus subscriber module 2 furthermore has one or several connections 10, 11 (or interfaces), in particular, the connection of external field units 12, such as actuators, sensors, initiators and the like, in particular, via electrical or optical lines/cables in order to supply them with energy and/or to transmit data to them and/or to receive, possibly process, signals for data from them and in order possibly to transmit data back to a Gateway module 13. (FIG. 3) The bus subscriber modules furthermore have at least the kind of electronics required to constitute a complete receiving unit and—if data are to be sent back—a transmitting unit for data (see FIGS. 8 and 10).

As shown in FIG. 3, a Gateway module 13 having a microcontroller 18 is provided that is hard wired to supply electrical energy from source 16 to supply bar energy interface 5 via energy interface 14, and to provide data signals from superordinate bus level device 17 via bus level interface 19, microcontroller 18, and hard-wired data interface 15.

The Gateway module 13 is preferably inductively or capacitively coupled with the supply bar 4, although it could be hard wired as well. Gateway module 13 furthermore can include the electrical and/or electronic structural parts necessary to make a transmission unit or a combined transmission and receiving unit or device. It would, however, also be conceivable to integrate these components directly into the supply bar 4 and to equip the latter with a gateway function.

Gateway 13 is used especially for coupling energy in from an external energy source 16, such as a power pack via the energy transmission interface 14 into the energy transmission interface 5, and data communication with a superordinate bus level 17, which, for example, can have an SPS [memory programmed control]. Gateway module 13 also has a microcontroller 18, which in this case is connected with the energy transmission interface 14 as well as the data transmission interface 15 and to a bus level interface 19.

A control device, which in a superordinate manner controls or regulates the data and energy transmission of the Gateway into the energy and data transmission interfaces 5, 6—especially the microcontrollers 18 of Gateway module 13 or some other control device—is then preferably designed so that the system can then be reregulated in accordance with a determined actual state.

Preferably, the resonance frequency—in particular, in case of an inductive design of the interfaces—of the system as a whole is readjusted in order to set the particular optimum operating point on the bus subscribers in case of a variable number of bus subscriber modules. Possibly, the input voltage is also readjusted. Readjustment can also be achieved, especially with the help of a reference bus conductor module, which can also be integrated into the Gateway and which can then be used as reference for the readjustment.

To that extent, of course under circumstances not in any compulsory manner, we would need a certain effort in terms of adjustment technique. On the other hand, however, it is also possible to reduce the design effort and especially definitely to increase the manageability of the system at the operation site and its variability.

FIG. 4

According to a particularly preferred embodiment of the invention, the energy and/or data transmission device consisting of the structural elements of Gateway 13, which are necessary for reception and transmission and supply bar 4, are designed so that more than one bus subscriber module 2 can be coupled upon them. For this purpose, at least one of the elements or both elements, that is, energy and data transmission interface 5, 6 of supply bar 4, are designed so that more than one of the bus subscriber modules 2, especially several of the bus subscriber modules 3, can be coupled on them.

FIG. 5

Figure 5:
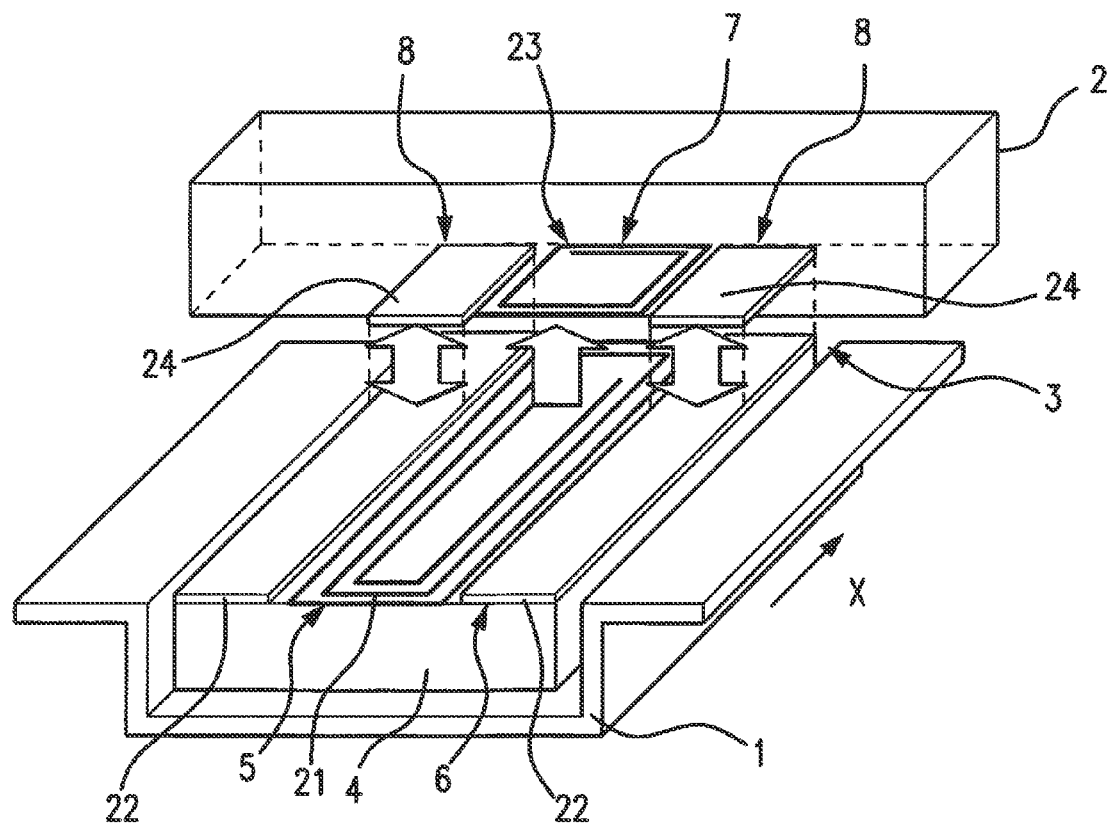
FIG. 5 is a schematic diagram of a basic circuit including an inductive energy coupling arrangement and a capacitive data conductive arrangement.

In the embodiment illustrated in FIG. 5, the supply bar 4 includes and inductive energy primary interface 5 in the form of a relatively long coil 21, that is coupled with an inductive secondary interface 7 in the form of a relatively short second coil 23. The primary data transmitting interface 6 comprises a pair or relatively long parallel spaced strip conductors 22 arranged on opposite sides of the coil 21 for coupling with secondary data interfaces 8 in form of a pair of relatively short capacitive strip conductors 24.

Preferably, the energy transmitting interface 5 and the data transmitting interface 6 are designed so that they will act capacitively or inductively; in that connection, they preferably in each case have correspondingly at least one primary inductivity 21 (coil) or one primary electrode (one strip conductor or one metal plate or coating or the like) of a capacity (condenser) (see FIG. 5).

In FIG. 5, for example, inductive interface 21 is so designed that it can be used as primary-side energy transmitting interface 5, and the strip conductors 22 are used as primary-side data transmitting interface 6. As one can see in FIG. 5, elements 21, 22 in each case extend along the main extension direction X over a longer distance than the individual bus subscriber modules 2 or their energy and data transmitting interfaces 23 and 24 (see FIGS. 7, 9, and 18).

On that score, the invention definitely deviates from the past trend of providing per bus subscriber module in each case a separate energy and data transmission device or in each case to provide a separate inductive or capacitive coupling.

This altered design offers many advantages. For instance, it is quite obvious that the design shown in FIG. 5 makes it readily possible to set the individual buses for the modules along the main longitudinal direction X of mounting rail 1 at any random site in the main longitudinal direction X. It is not necessary, as in the state of the art, to speak to any particularly predetermined grid. That also makes it possible to insert bus subscriber modules 2 with widths that differ along the main longitudinal direction X.

Furthermore, with regard to the energy and data transmission device, the structural or design effort is diminished because less primary inductivity (coils) 21) are now needed. According to the particularly preferred embodiment, only one single one of the primary inductivities 21 is required.

FIGS. 6-8

Figure 6:
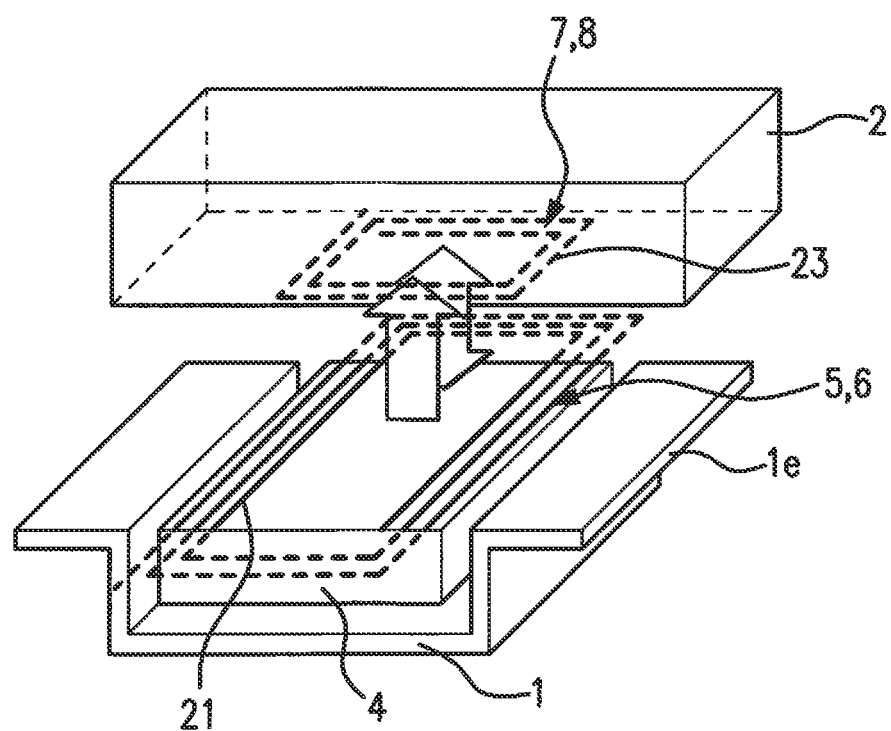
FIGS. 6-10 are schematic diagrams illustrating alternate inductive and/or capacitive conductive arrangements.
Figure 7:
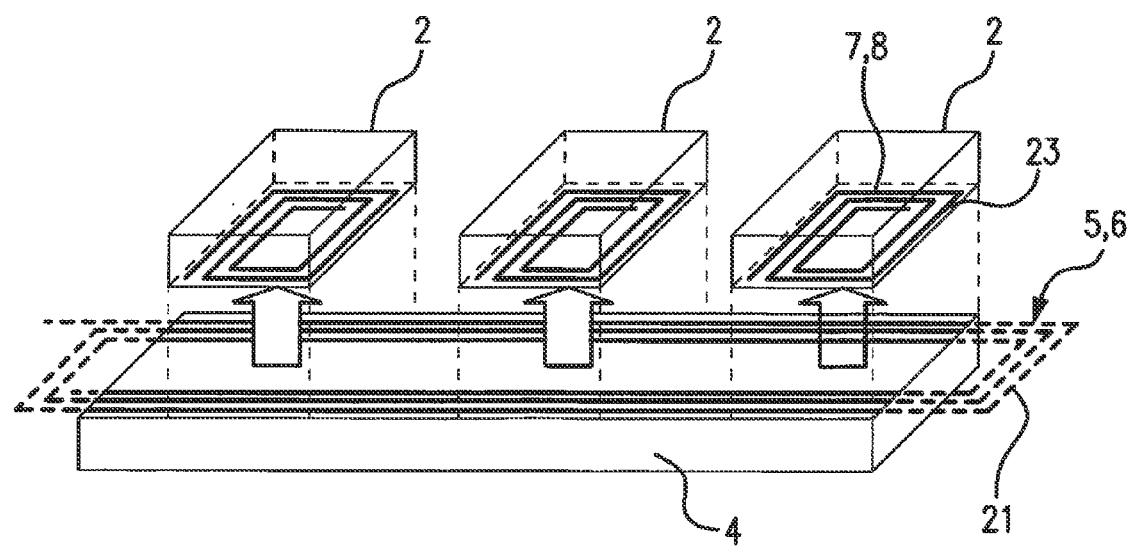

According to the modification shown in FIG. 6, the primary-side interfaces 6, 7 are combined for energy and data transmission in a primary-side inductive coil 21 coupled with a single secondary inductive coil 23, which reduces the number of parts and the structural space required. As shown in FIGS. 7 and 8, a plurality of subscriber modules 2 may be supplied with electrical energy and data signals from a single relatively long primary coil 21, and corresponding secondary coils 23 associated with the respective subscriber components 2.

Figure 9:
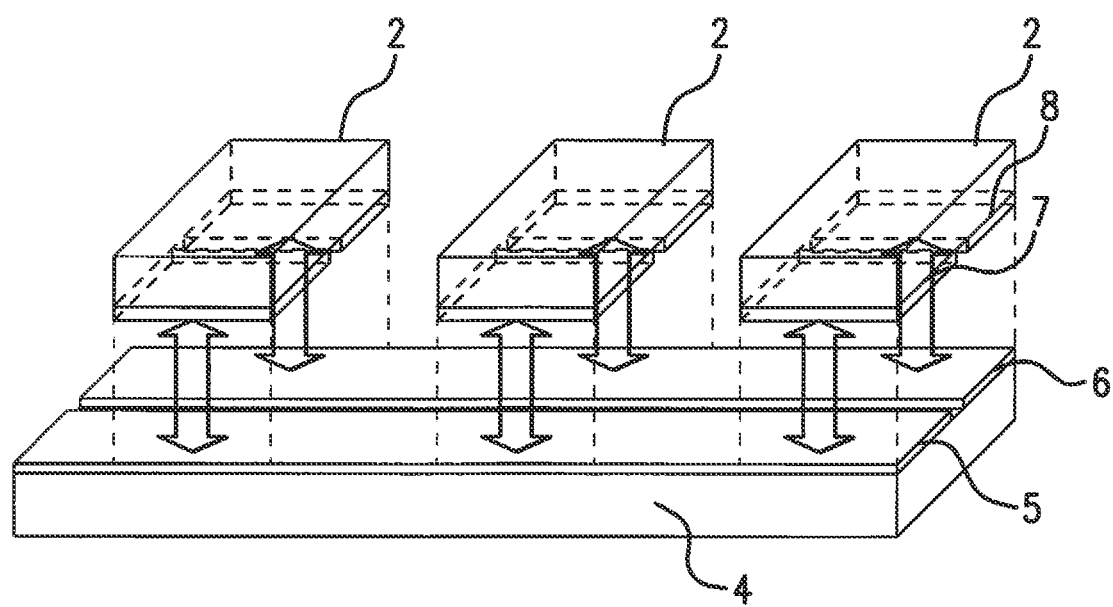

FIGS. 9 and 10

In the embodiment of FIGS. 9 and 10, the supply bar 4 is provided with relatively long capacitive electrical energy and data signal plates 5 and 6 that are coupled with the corresponding secondary capacitive interfaces 7 and 8 of a plurality of subscriber modules 2, respectively.

FIG. 11-13

In order to prevent the unauthorized mounting of a subscriber module 27 onto a mounting rail 1 provided with a supply bar 4', a coding arrangement is achieved by causing the supply bars to have a greater height dimension relative to the height of the mounting bar, whereby a protruding portion 25 (FIG. 11) of the supply bar will extend upwardly above the level of the flange portions of the mounting rail 1. The authorized subscriber module 2' is provided with a corresponding recess 26 (FIG. 12) for receiving the upwardly protruding portion 25 of the supply bar 4', thereby to permit mounting on the mounting rail. However, since the unauthorized subscriber module 27 does not contain such a recess, it cannot be mounted on the mounting rail 1 (a represented by the symbol X).

Figure 11:
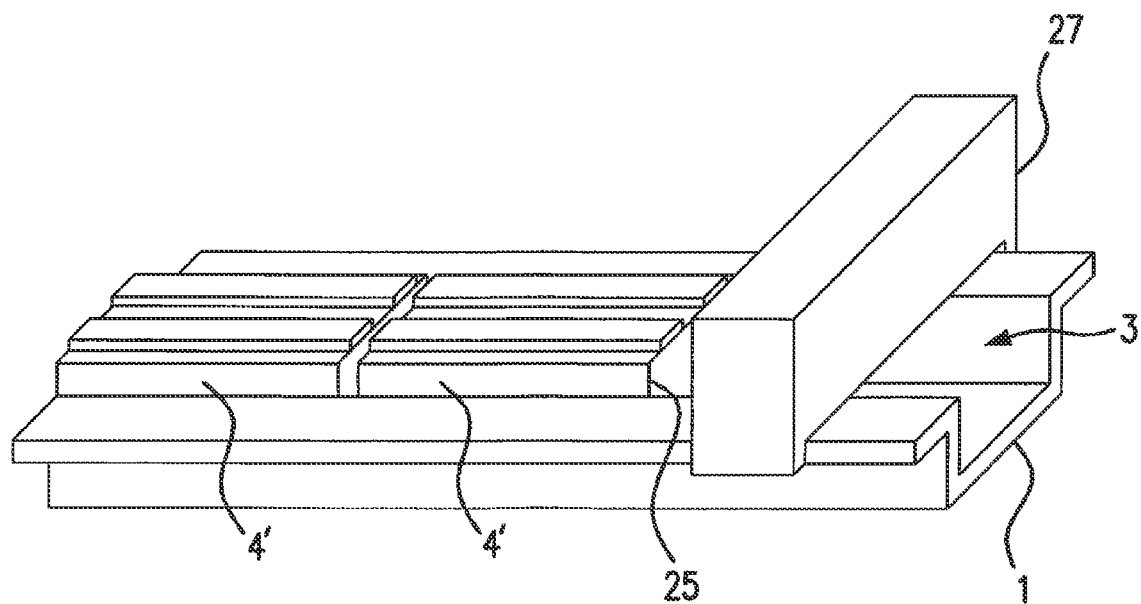
FIGS. 11-13 are perspective illustrations of a coding arrangement for assuring proper connections between associated bus subscriber and mounting rail components.
Figure 12:
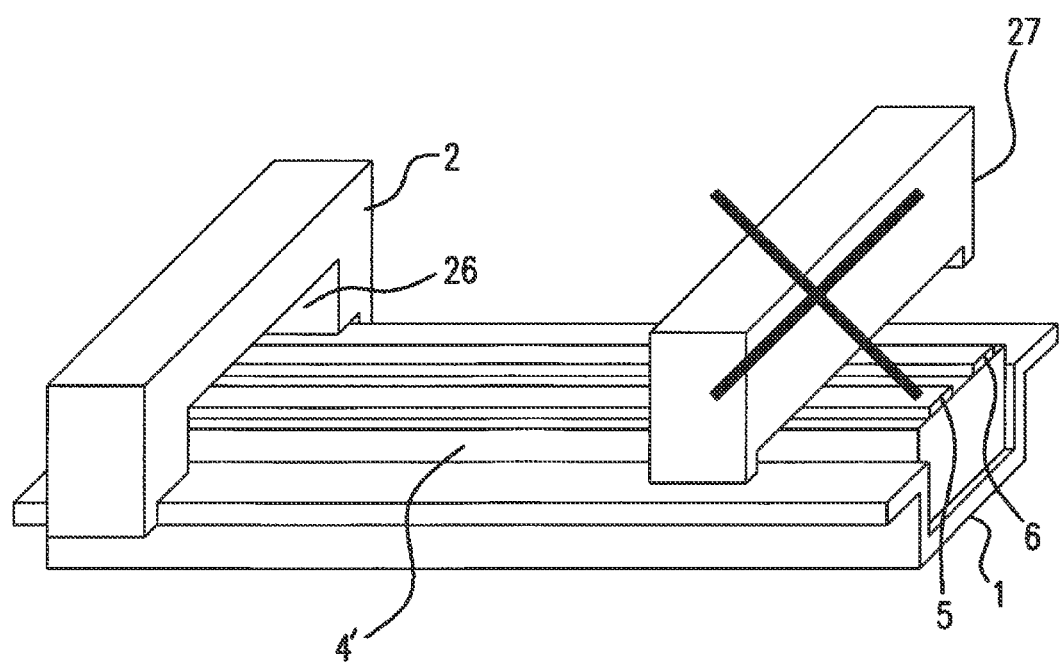
Figure 13:
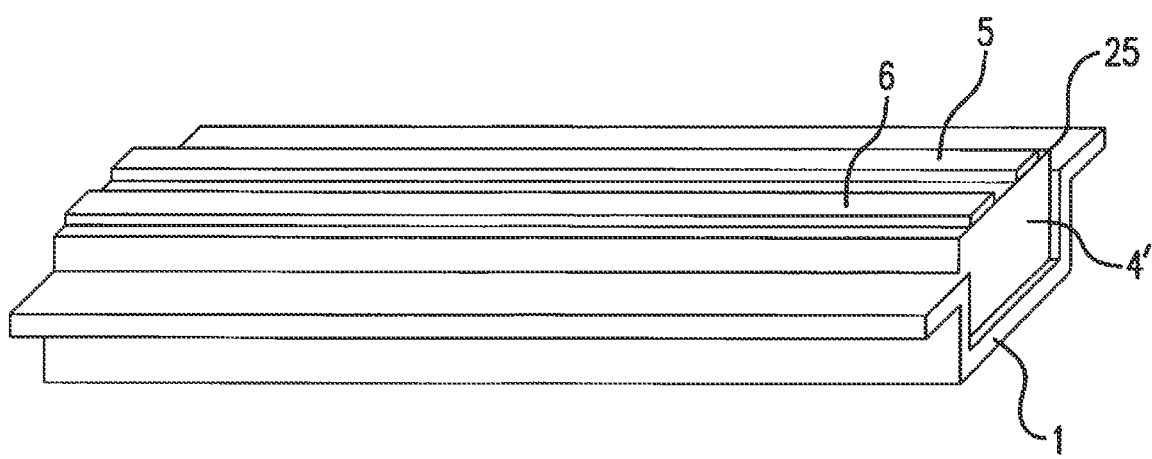

According to another advantageous variant of the invention illustrated in FIGS. 11 to 13, at least one segment of the energy and transmission device is positioned perpendicularly with respect to mounting rail 1 in the Z direction, protruding upward with a protruding area 25 sticking out of free space 3. Accordingly, the housings of bus subscriber modules 2 and the Gateway modules 13 then have a recess 26 that corresponds to area 25. In this way, one can advantageously set up a coding system, which in a mechanically operating fashion prevents modules 27 (FIG. 12) that do not belong to the system from being locked on. That is also used especially to prevent any distorting influence upon the system.

Figure 14A:
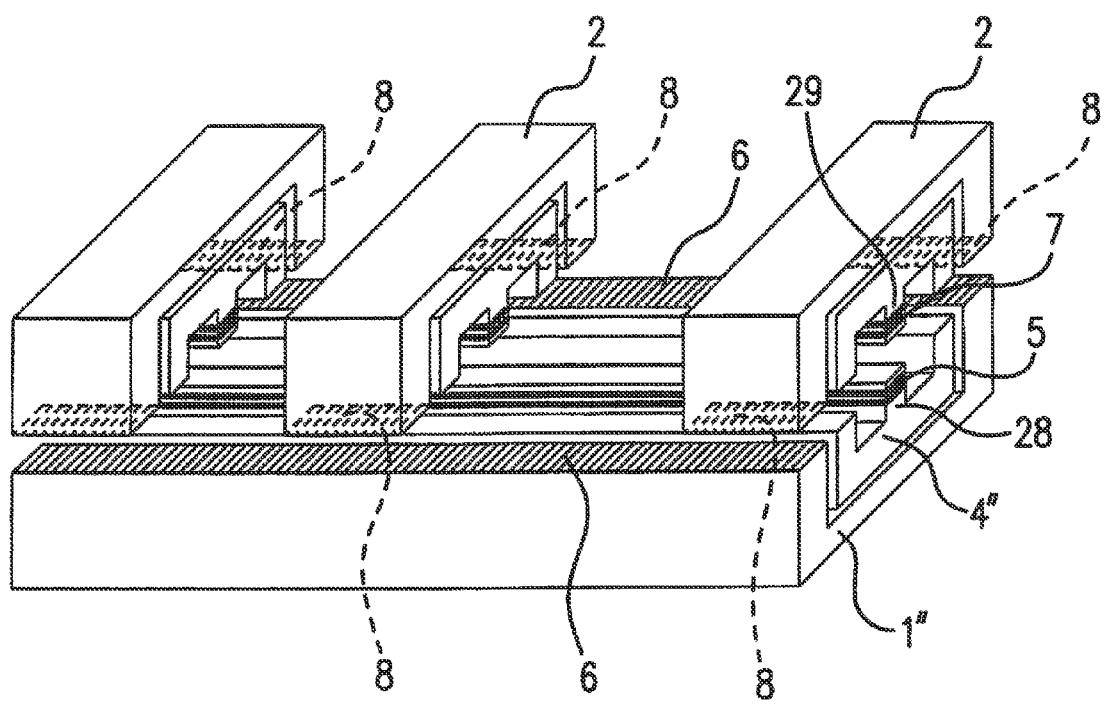
FIG. 14a is a perspective view of a supply system including a plurality of bus subscriber components supplied by inductive energy and capacitive supply interfaces.
Figure 14B:
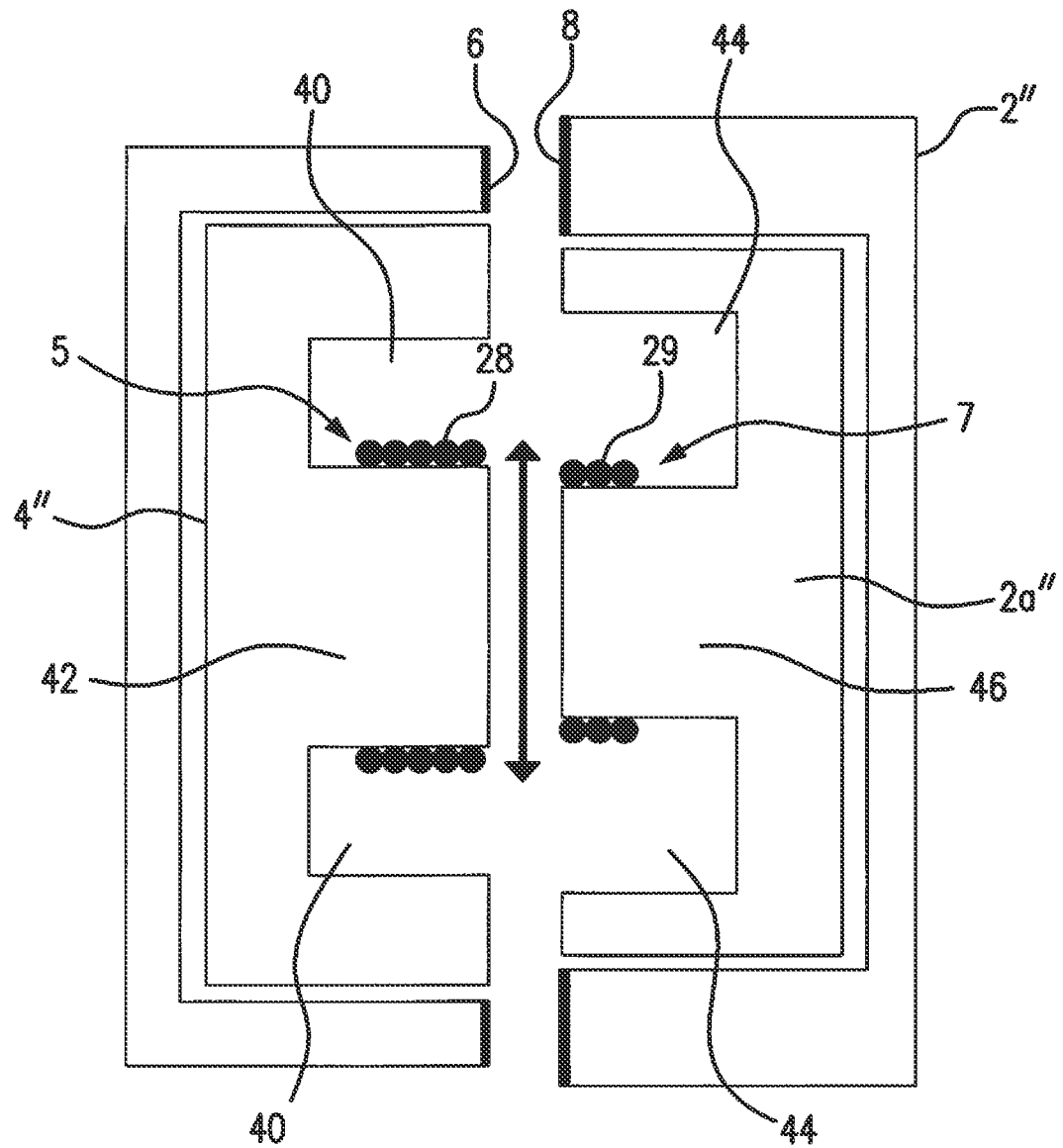

FIGS. 14a and 14b

In order to compensate for positioning inaccuracies of the primary and secondary interfaces, the supply bar 4" may be provided with an E-shaped cross-sectional configuration including a pair of longitudinal grooves 40 arranged on opposite sides of a center projecting section 42. Similarly, the bus subscriber module 2" includes a core portion 2a" having an E-shaped cross sectional configuration defining a pair of longitudinal grooves 44 arranged on opposite sides of the center projecting section 46. The primary inductive interface 5 comprises a relatively long coil 28 that is wound about the center section 42, and the secondary inductive interface 7 comprises a smaller secondary coil 29 wound around the center section 46 of the bus subscriber core portion.

The primary and secondary electrical energy and data signal interfaces 6 and 8 comprise capacitive plates of unequal size mounted in opposed relation on the end surfaces of the mounting bar 1" and the bus subscriber modules 2". Accordingly, the inductivity (see primary core 28) of the primary side (mounting rail side) is wider than the inductivity (see the secondary core 29) of the secondary side (bus subscriber module 2″). In this way, a situation is avoided where the bus subscriber modules have to be positioned precisely in the Y direction normal to the mounting rail. Instead, an overlapping area is created within which positioning inaccuracies can be adjusted or will turn out to be immaterial.

Figure 15:
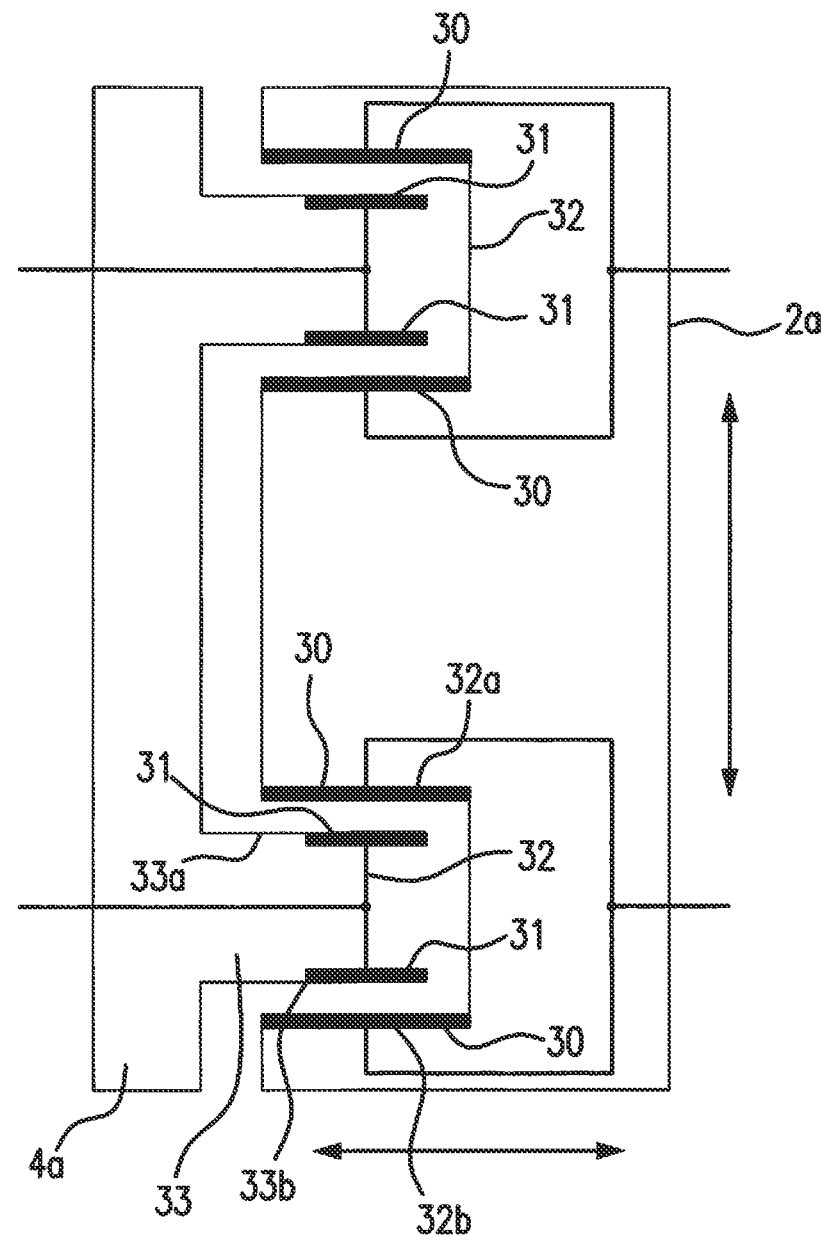
FIG. 15 is a schematic representation of the inductive and capacitive contactless coupling between a supply bar and an associate bus subscriber component.
Figure 16:
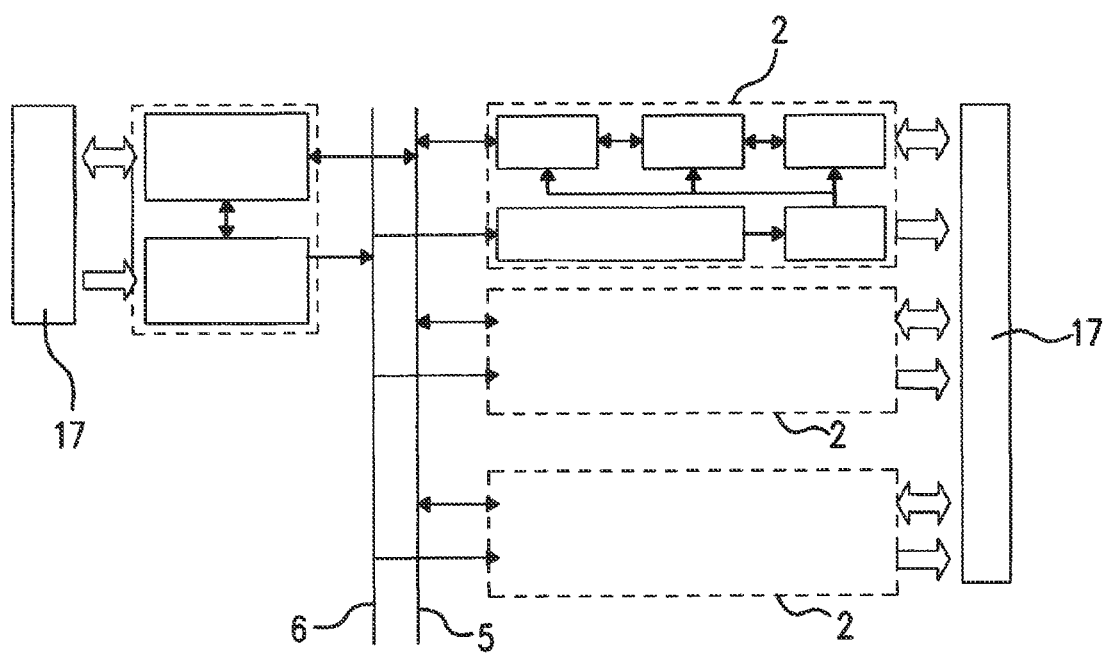
FIG. 16 is a schematic diagram of a capacitive arrangement for supplying data to a plurality of bus subscriber components.

FIGS. 15 and 16

Referring to FIGS. 15 and 16, according to a capacitive embodiment for compensating for positioning inaccuracies of the components, the supply bar 4*a* includes a pair of parallel spaced integral projections 33 that extend into corresponding grooves 32 contained in the adjacent face of the bus subscriber module 2*a*. The primary capacitive interfaces 31 are relatively small plates mounted on the faces 33*a*, 33*b* of the projections 33 opposite the corresponding relative large secondary capacitive plates 30 mounted on the walls 32*a*,32*b* of the recesses 32. This arrangement compensates for positioning inaccuracies in the Y and Z directions as shown by the double headed arrows. A plurality of bus subscriber components 2 may be connected in the capacitive system as shown in FIG. 16.

FIG. 15 creates a similar possibility for the adjustment of positioning inaccuracies. Here it is provided to fashion the electrodes of a capacitively operating energy and/or data transmission device in each case by means of parallel-extended strip conductors 30, 31. The latter, however, are not located in the X-Y level but rather in the X-Z direction. Preferably, the strip conductors in each case are made in pairs on the side legs 32*a*, 32*b* of a U-shaped recess 32 and on the side legs 33*a*, 33*b* of a corresponding projection 33. In this way, two capacities are made at each projection 33 or each recess 32. Preferably, furthermore, offset in the Y direction in each case two local projections 30 and two of the recesses 32 are made with two capacities of the kind described above.

In a furthermore preferred manner strip conductors 30 in the recess have a greater extent perpendicularly with respect to the mounting rail (in the Z direction) than do the strip conductors 31 on the side legs of the projections 30. In that way, in a simple manner, we can reduce the influence of positioning errors, both in the X direction and also in the Z direction.

A readjustment of the resonance operating frequency is conceivable but not compelling required; for example, it is not so required in case of a capacitive design of the interfaces or when only a few bus subscriber modules are provided with an inductive design for each primary inductivity.

Several bus subscriber modules 2 can also be tied in simultaneously in the capacitive, contactless, energy, and data coupling system.

The capacitive coupling surfaces for data transmission and energy transmission are preferably housed separately from each other in terms of space upon a suitable supporting structure of the supply bar 4.

The signals for energy supply are preferably processed on the primary side via an inverter and on the secondary side via a rectifier with a series-connected DC/DC converter in order to achieve the desired voltage (see FIG. 10).

As shown in FIG. 16, by means of a suitable design of the resonance-oscillating circuit, one can keep the resonance frequency constant regardless of the number of bus subscribers (bus subscriber modules 2).

FIG. 17

Figure 17:
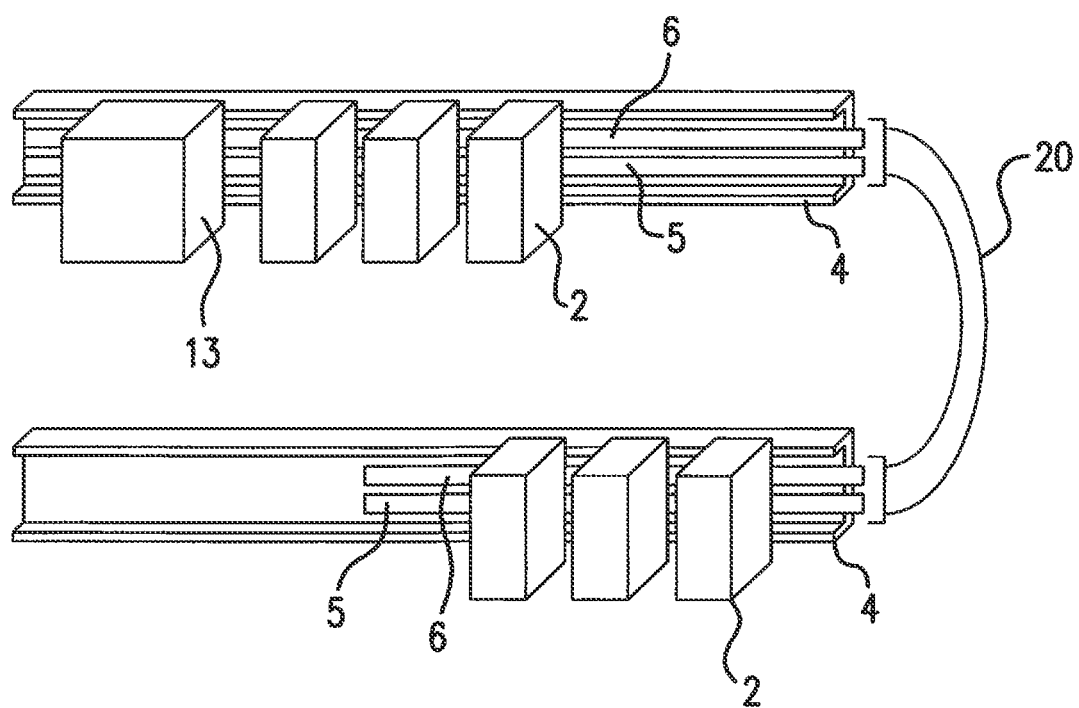
FIG. 17 is a schematic representation of the use of cables for connecting together a plurality of mounting rail and bus subscriber component assemblies.

It is also conceivable that each of the supply bars 4 would extend only over a part of the length of mounting rail 1, for example, for a distance of 1 m, in other words, over half the length of the mounting rail, whereby the individual supply bars 4 are then connected with each other via cables 20 (FIG. 17). In an analogous manner, the supply bars 4 can be connected with each other via cables extending over several mounting rails 1. The system in this way becomes very flexible.

Advantageously, the supply bars (preferably only) have primary inductivities/coils 21 and/or primary electrodes (for example, strip-like conductors) 22, which display an extent in the mounting rail direction x that is greater than the extent of two bus subscriber modules.

Figure 18:
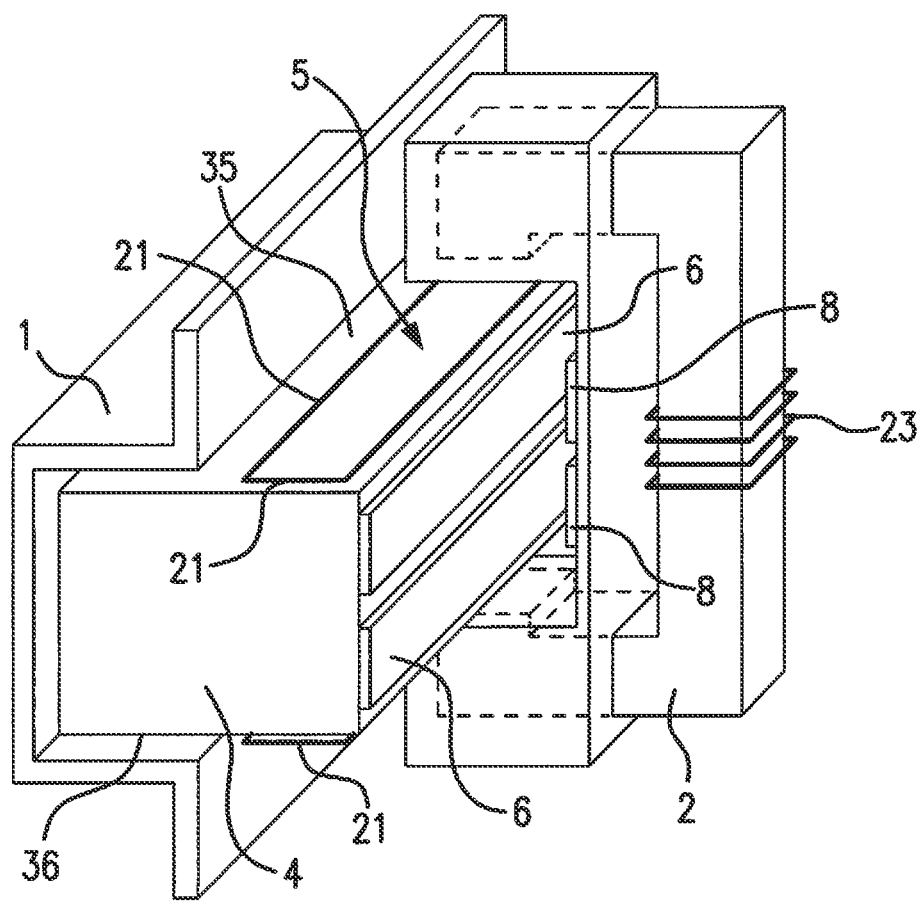
FIGS. 18 and 19 are perspective views illustrating various contactless inductive and capacitive coupling arrangements.
Figure 18A:
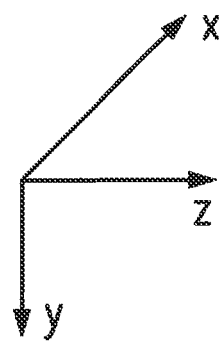
Figure 19:
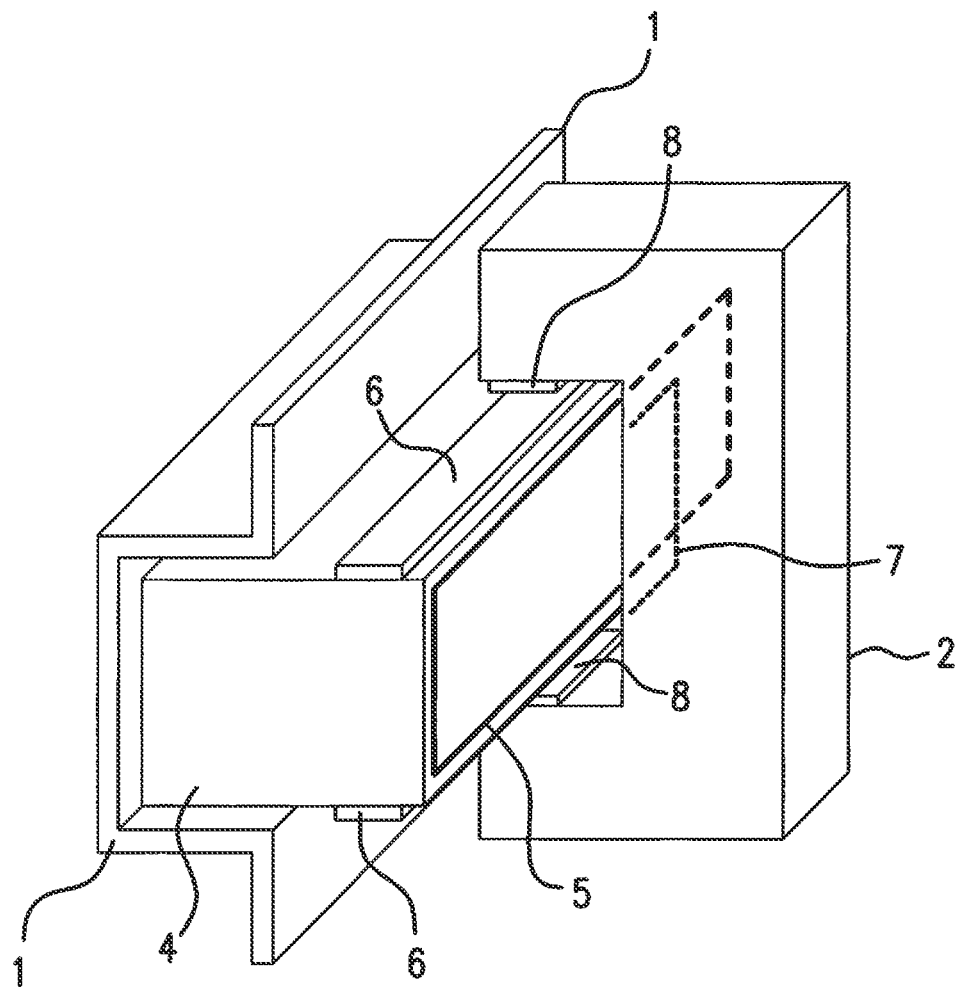
Figure 19A:
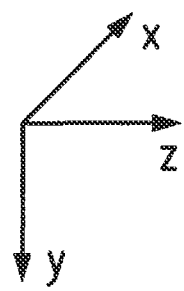
FIG. 19a is a vector diagram illustrating the axes of reference in FIG. 19.

FIGS. 18 and 19

FIG. 18 illustrates an embodiment for inductive electrical energy transmission and for capacitive data transmission. Here, on the supply bar 4 at a level parallel to the X-Y level, there is provided an interface 6 for capacitive data transmission, and on the bus subscriber module 2, there is provided a corresponding interface 8 for a capacitive data transmission on a corresponding surface of a level parallel to the X-Y level. On the other hand, energy transmission with inductive interfaces 5 takes place inductively with coils 21 mounted on the sides 35 and 36 of the supply bar 4, which are parallel to the X-Z level, and inductive secondary coil 23.

FIG. 19 finally also shows a possible modification for primary and secondary inductive energy transmitting interfaces 5 and 7, and for capacitive primary and secondary data transmitting interfaces 6 and 8, respectively. Here, the coils again are located opposite each other at the levels of the X-Y level, while the electrodes for capacitive data transmission are arranged on the sides of the bus bar at the Y-Z level.

According to FIGS. 18 and 19, the interfaces on the supply bar 4 for energy transmission and for data transmission are aligned clearly separated from each other in terms of time on various levels—in this case, on levels that are aligned orthogonally with respect to each other.

FIGS. 20-25

FIGS. 20 to 25 illustrate a method for position determination in linear arrangements. In this method for contactless position determination of the alignable bus supply modules 2, the use of capacitive energy and/or data transmission interfaces 5, 6 is preferred. In this case, each individual subscriber or each individual bus subscriber module 2 in conjunction with mounting rail 1 forms two coupling capacities with energy and data transmission interface.

Figure 20:
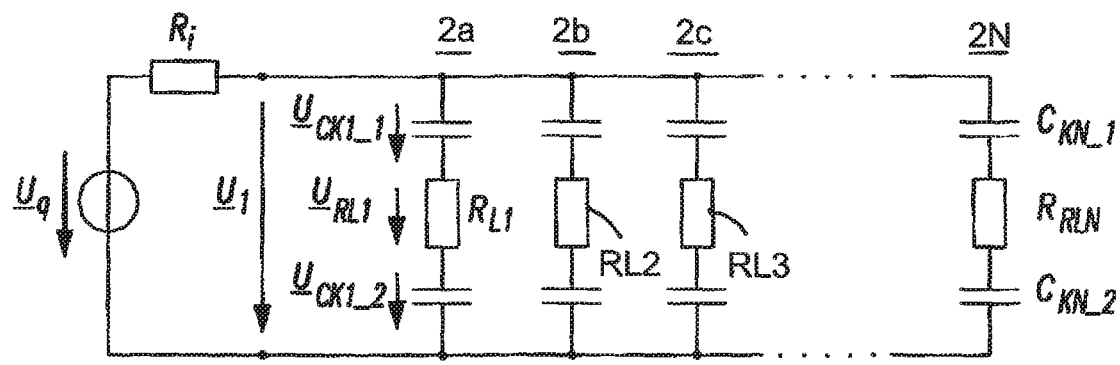
FIGS. 20-22 are circuit diagrams illustrating various embodiments of circuits for position determination.
Figure 21:
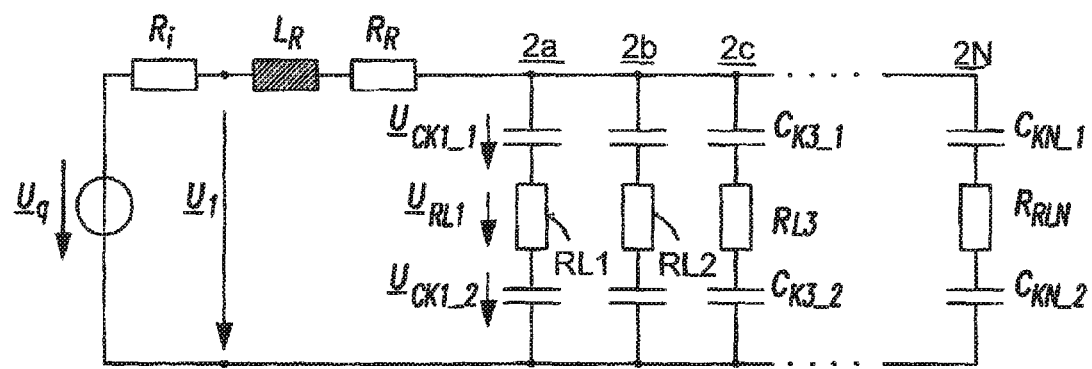
Figure 22:
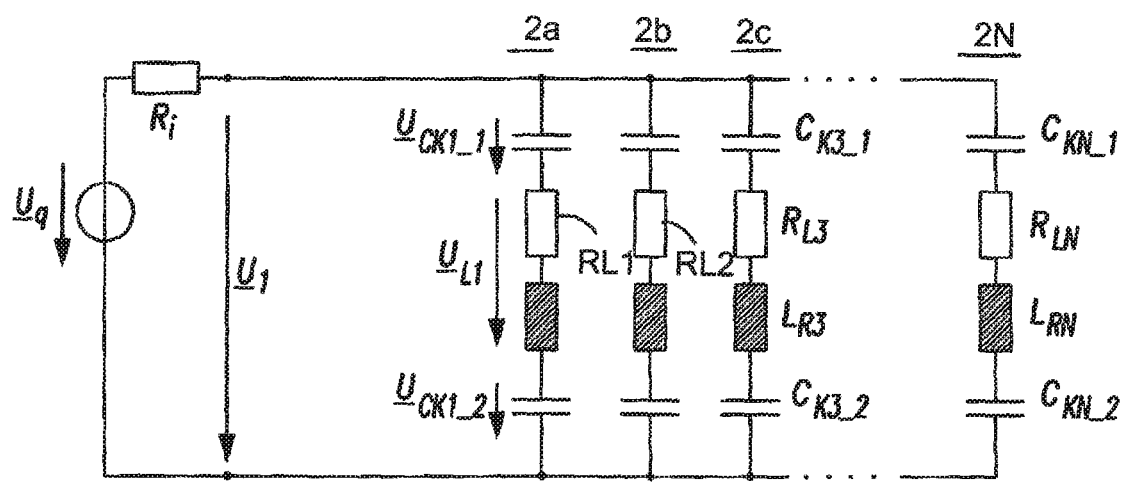

FIG. 20 is a circuit diagram of a first embodiment wherein the voltage is measured on the secondary side, FIG. 21 is an embodiment of a circuit with series resonance on the primary side, and FIG. 22 is an embodiment of a circuit with series resonance on the secondary side.

FIG. 20 shows a circuit variant 1 where the voltage is measured on the secondary side. The simplest method for position determination on the secondary side can be implemented by measuring a voltage drop (respective current flow) via a load resistance. As the capacity of the coupling condenser increases, there will be a decrease in the related occurring voltage drop, which, in case of constant input voltage on the primary side, will result in a higher voltage drop via the particular load resistance on the secondary side.

FIG. 21 shows a circuit variant 2 with a series resonance on the primary side. The setup, which gets along with a very small number of additional components, uses a resonance inductivity on the primary side. The signal, which is coupled in on that side, therefore, must correspond to the system resonance frequency, which results from the value of the inductivity and the parallel coupling capacities. In that way, the system resonance frequency is not constant, but rather is a function of the number of the existing secondary-side modules. An analysis of the resonance frequency on the primary side therefore facilitates the determination of the number of subscribers but not the sequence. FIG. 22 illustrates a circuit variant 3 with series resonance on the secondary side.

FIG. 23

Preferably, the capacity here is designed so that its site can be changed (FIG. 23) in that one or both have a geometry that is altered in the X direction and/or in that their interval in the X direction varies and/or that a dielectric, possibly arranged on one or both electrodes, would vary in terms of its constitution or geometry. In this way, along with the capacitive energy and data transmission and inductive energy and data transmission, in particular, it is also conceivable to design the energy transmission interface inductively and to design the data transmission interface capacitively. In this way, a particularly large number of subscribers can be tied in.

A central control unit again regulates the access of the bus subscriber modules 2 to the network (master-slave principle). This facilitates the decoupling of inductive and capacitive signal transmission by the use of different frequency ranges as well as by a different geometric arrangement. Preferably the geometric model is so fashioned that a great mechanical positioning tolerance will be permitted.

Here it is also provided for automatic position recognition to take place according to the previously described method. The signals that are generated in the process are analyzed means of the microprocessor or the control device. In this process, a resonance frequency is determined Once this resonance frequency has been determined, the level of the site-related resonance peak is analyzed. For this purpose, for example, the strip conductor, which constitutes a part of the coupling condenser, is not made on mounting rail 1 in a rectangular form but rather in a previously known geometry that differs from the final form.

Figure 23:
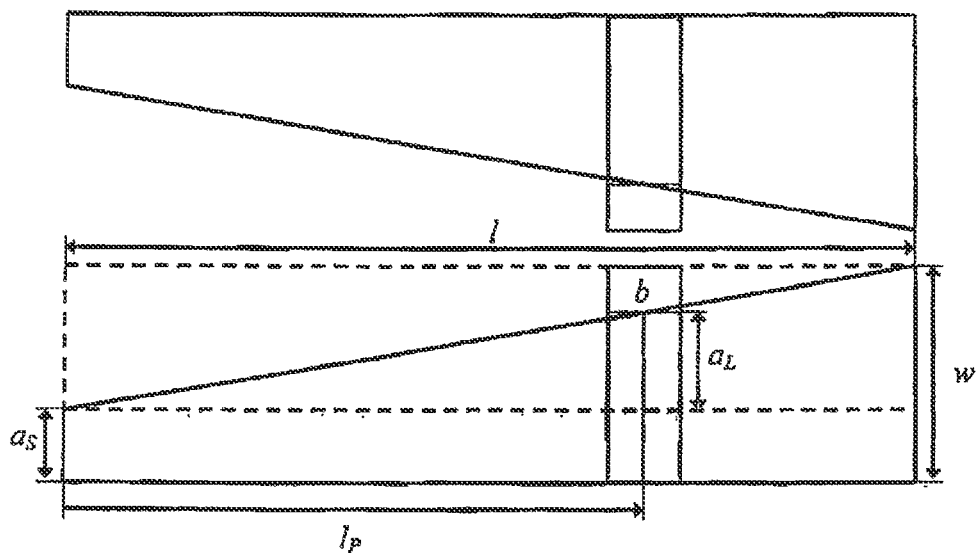
FIG. 23 is a schematic diagram illustrating the manner of on-site position determination.
Figure 24:
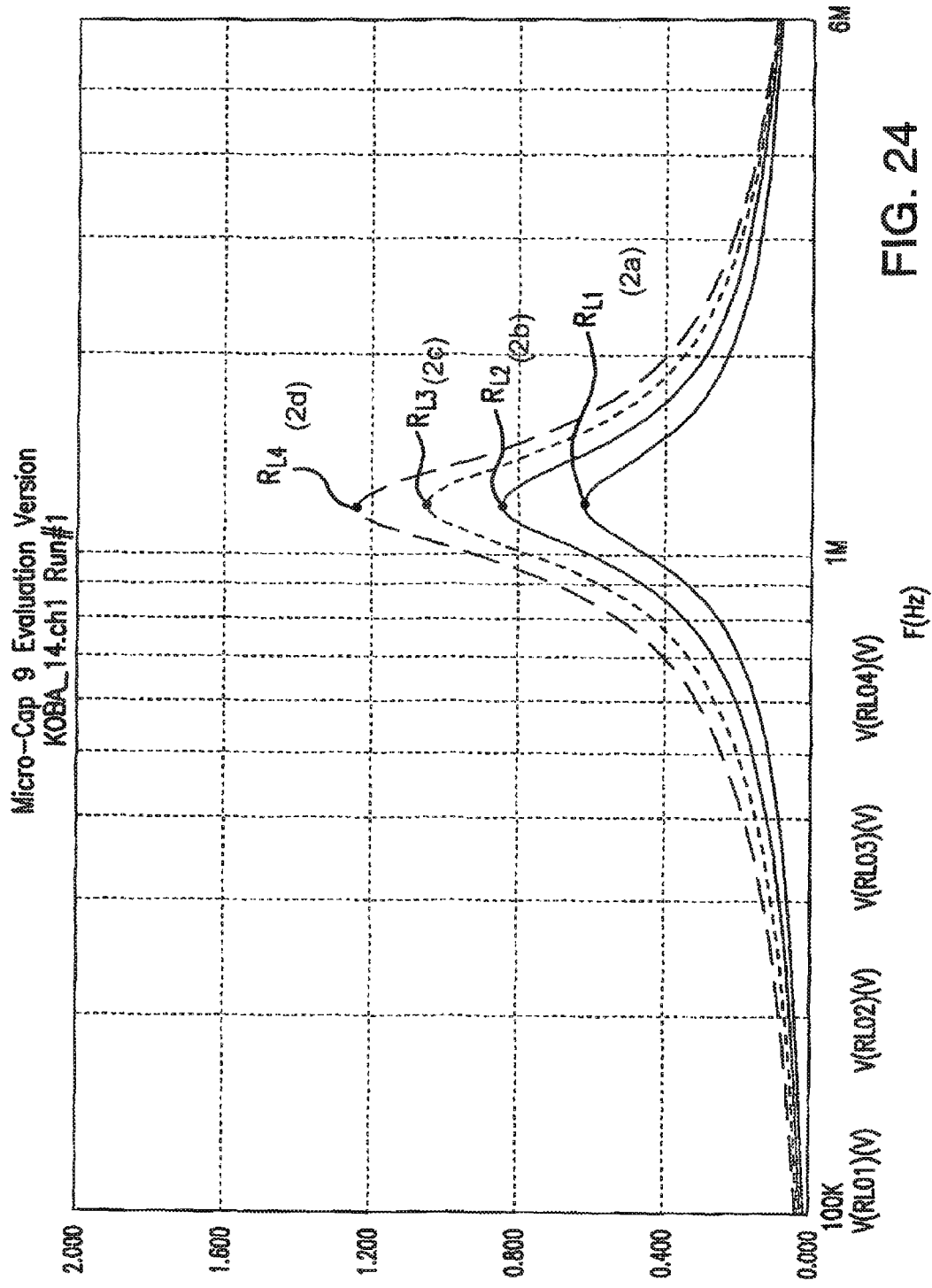
FIGS. 24 and 25 are graphs indicating the results of site determination corresponding with the circuits of FIGS. 20 and 22, respectively.

According to FIG. 23, it is provided that the strip conductor will widen starting from a base width Y at a site in the X direction, that is to say, its width in the Y direction will increase. Over the width, an alterable capacity results in the X direction. From the capacity, we can to that extent draw a conclusion as to the site of the particular locked-on component.

In the following, a preferred method is set forth for position determination in linear structures, such as are represented by the supply bar with its primary electrodes and/or primary inductivities.

To determine the sequence of the mounted subscribers or bus subscriber modules 2, it is required either to make a complete count of all of the subscribers in a linear fashion or to determine and compare their individual geometric positions. It is proposed to change a special physical magnitude along the direction of extent of the mounting rail. The fact that this involves a contactless connection restricts the choice of available physical parameters; but this instead offers a capacitive solution. The change of the capacity between two electrodes, which can be done in the form of strip conductors, can be achieved by various measures.

$$C_K = \varepsilon_0 \cdot \varepsilon_R \cdot \frac{A}{d} \quad (1)$$

Starting with the basic mathematical description of the capacity, such as it is described by the above formula, one can use a site-related design of surface A, of the electrode interval d, or of the properties of the dielectric described by the dielectricity number $\varepsilon_R$ in order to get a just as site-related coupling capacity, which can be analyzed by means of measurement technology. Using the example of the variable surface, we will now describe a possible execution of the electrode arrangement, which is suitable for use on the supply bar and which can possibly be combined directly with the energy and/or data connection.

In this connection, FIG. 23 illustrates a possible geometric design of the electrode surfaces for position determination. Here, we use a triangular base surface on the primary side, which in combination with the opposite-placed electrode surface on the secondary side facilitates the formation of two condensers whose capacity value depends directly on the overlapping surface and thus on the position of the module. The effective surface A results from the product of the secondary module width b and the average vertical dimension a, which can be expressed as follows as a function of the position variables $l_p$:

$$a = a_s + a_L, \quad (2)$$

with $$a_L = \frac{w - a_s}{l} \cdot l_p \Rightarrow a = a_s + \frac{w - a_s}{l} \cdot l_p$$

The effective surface A, therefore, can be determined generally from the product of a and b:

$$A = a \cdot b = \left(a_s + \frac{w - a_s}{l} \cdot lp\right) \cdot b \quad (3)$$

Inserted into the formula for general capacity calculation, we can therefore set up the following equation for position-related coupling capacity $C_K$:

$$C_K(l_p) = \varepsilon_0 \cdot \varepsilon_r \cdot \left(a_s + \frac{w - a_s}{l} \cdot lp\right) \cdot \frac{b}{d} \quad (4)$$

The boundaries of the system resonance frequency are described by two states. The highest possible resonance frequency will result for the case where only one single subscriber is present and where the latter is located in the position of the smallest coupling capacity. This state is generally described as follows:

$$C_{K-min}\left(l_p = \frac{b}{2}\right) = \varepsilon_0 \cdot \varepsilon_r \cdot \left(a_s + \frac{(w - a_s) \cdot b}{2 \cdot l}\right) \cdot \frac{b}{d} \quad (5)$$

The lower boundary value of the resonance frequency is determined by the case where the system is occupied over its entire length, something that results in the maximum possibly effective coupling capacity:

$$C_{K-min} = \varepsilon_0 \cdot \varepsilon_r \cdot \left(a_s + \frac{w - a_s}{2}\right) \cdot \frac{l}{d} \quad (6)$$

Generally, the resultant boundary frequencies can be formulated as follows:

$$f_{R-min} = \frac{1}{\pi \cdot \sqrt{2 \cdot L_R \cdot C_{K-max}}};\quad(7)$$

$$f_{R-max} = \frac{1}{\pi \cdot \sqrt{2 \cdot L_R \cdot C_{K-min}}}$$

The voltage drop on the secondary side, which can be used for the individual position determination, depends on the particular secondary-side impedance, which results from the series connection of the coupling condensers and the load resistance:

$$Z_{2N} = R_{LN} + \frac{2}{j\omega \cdot C_{KN}} \quad (8)$$

These secondary impedances are arranged parallel from the viewpoint of the primary side and thereafter are impacted with the same input voltage:

$$(2 \cdot U_{CKN} + U_{LN} = \text{const.}). \quad (9)$$

FIG. 24

Working with constant secondary-load resistances, the voltage on the secondary side therefore is a function of the individual coupling capacity, respectively, of the site variables $l_p$. Using the example of a system with four subscribers on different positions, the voltage curve can look like the simulation for the variant 1 (FIG. 20) shown in FIG. 24. The modules 2a-2d are recognized along the Y (voltage) axis.

As an alternative to the provision of the resonant circuit on the primary side (FIG. 21), the inductivity required for the resonance condition can also be arranged on the secondary side (FIG. 22). In contrast to the circuit variant 2 (FIG. 21), the number of required components will increase, and this number will now depend on the number of subscribers. Furthermore, the position of a subscriber is defined not only by the level of the voltage drop on the secondary side but also by the particular resonance frequency. Looking at it from the primary side, we now no longer get a single system resonance frequency (FIG. 21), but rather individual resonance frequencies (FIG. 22), which are defined by the particular subscriber position. As a result of this resonance circuit arrangement, the individual subscriber can determine his own position in that he finds his own individual resonance frequency, but from the viewpoint of the primary side, one can also determine the number as well as the position of the connected subscribers.

To be able to determine a resonance frequency, it is required to general a voltage or current signal on the secondary side that is sufficiently strong for a measurement. Using the example of a secondary-side voltage, we can set up its expression as a function of the coupling capacity, as described below:

$$\underline{U}_{RLN} = \frac{R_{LN}}{\frac{2}{j\omega \cdot C_{KN}} + j\omega \cdot L_{RN} + R_{LN}} \cdot \underline{U}_1 \quad (10)$$

FIG. 25

Figure 25:
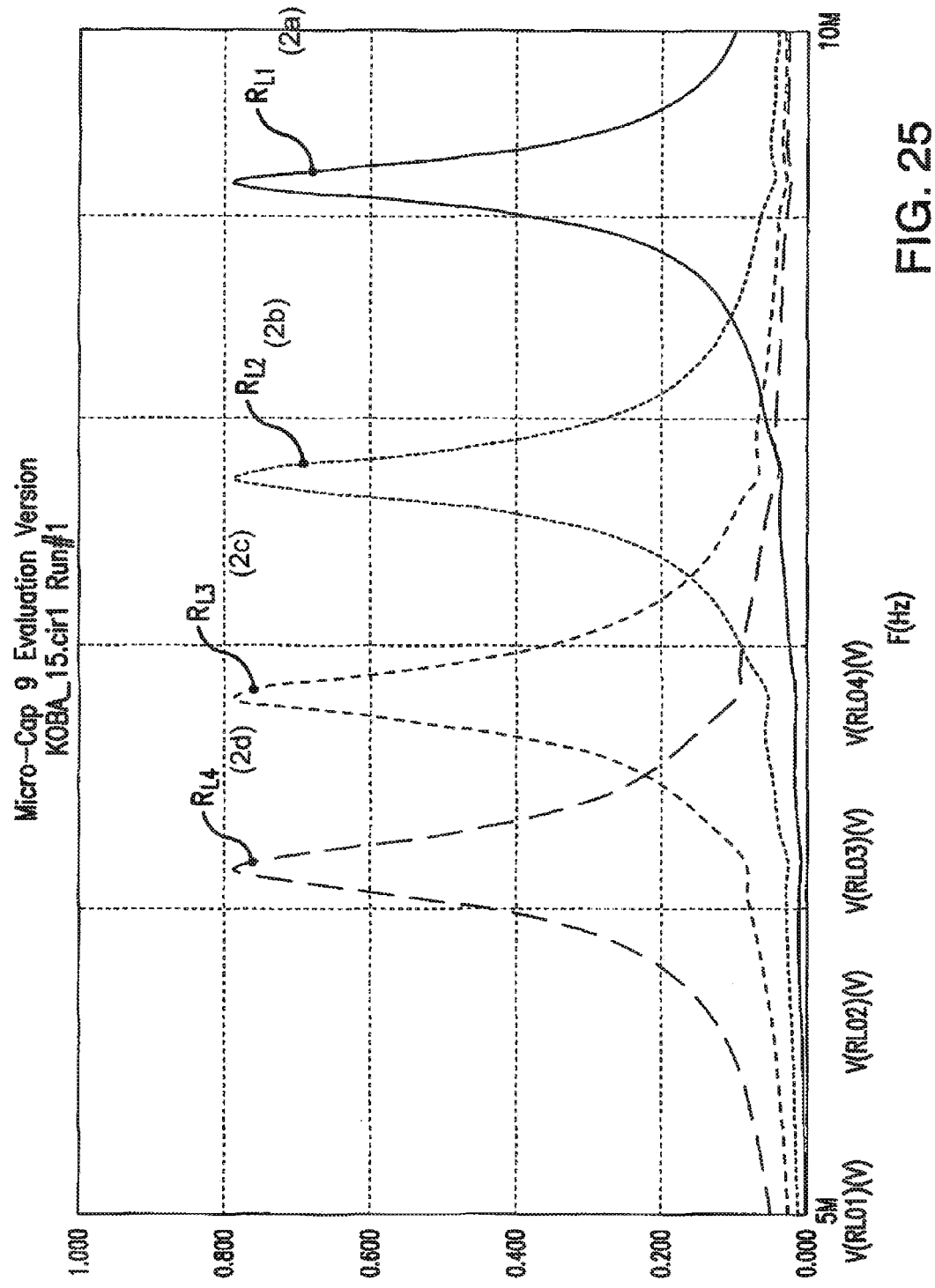

Considering the same parameter as in the simulation for circuit variant 2 (FIG. 21), the mathematical result for the resonance frequency distribution comes out as described in FIG. 25, which shows the simulation results for the circuit embodiment 3 (FIG. 22). The modules 2a-2d are recognized along the X (frequency) axis.

FIG. 26

Figure 26:
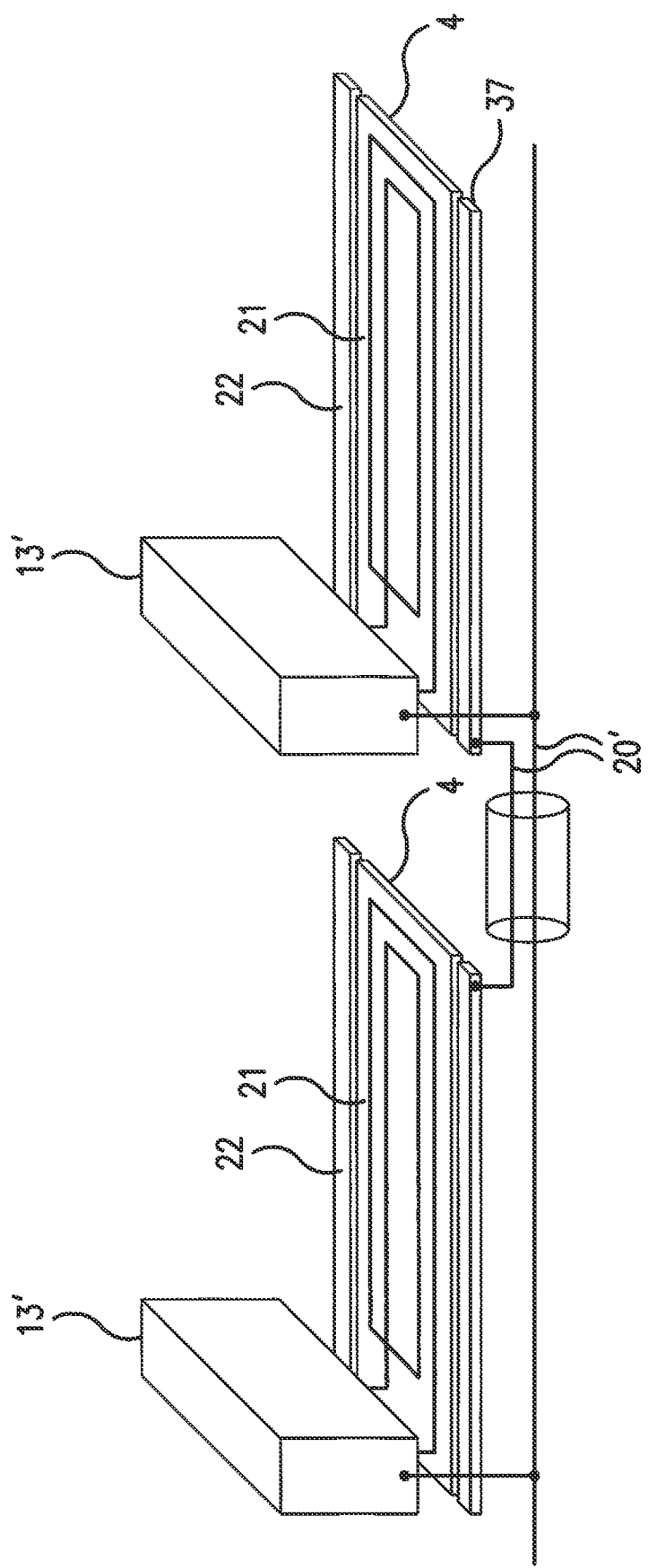
FIGS. 26 and 27 are schematic illustrations of other embodiments of contactless coupling systems in accordance with the present invention.

A modular structure of the supply bar is also conceivable where data transmission takes place via cables, but where, for purposes of energy supply, there is a separate feed for each module. This is illustrated in FIG. 26.

The supply bar 4 inserted into the mounting rail can be subdivided both throughout and also into individual segments. In case of a subdivision, the entire system as a whole nevertheless should be interconnected in a logical manner, and for that purpose, there is provided a dedicated cable connection 20 between the individual subsegments 31. The signal path for data transmission and an optional position determination (in each case at 37) can also advantageously be looped through along this route, although a feed for energy transmission is provided separately for each subsegment. In this way, the individual generator modules 13' can be made more cheaply because they have to supply less output and because readjustment turns out to be less complex.

FIG. 27

Figure 27:
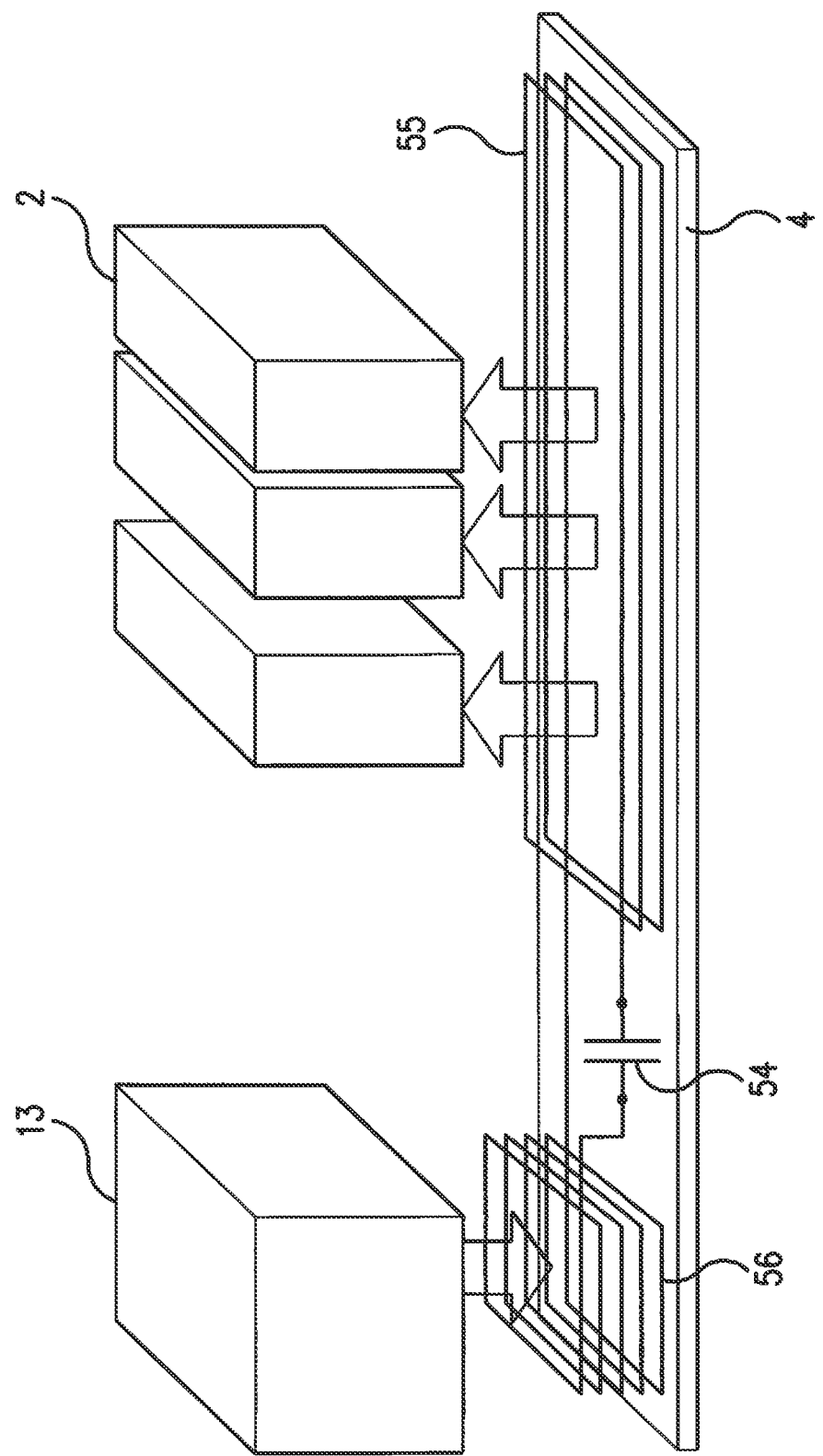

As shown in FIG. 27, it is also conceivable to provide is contactless data and/or energy coupling between a Gateway module 13 (or some other generator) and the supply bar 4. The alternate voltage generator is tied in with the primary coil in supply bar 4 either directly or via cable; however, inductive coupling is also conceivable here. Supply bar 4 in this case preferably contains a fixed catch position for Gateway generator module 13, which via a suitable transmitter couples the required signal into a secondary inductivity 56 that is located in the supply bar. The output of this transmitter then, via a resonance-oscillating circuit with condenser 54, feeds the actual primary coil 55, which facilitates the inductive supply of subscriber 2. An advantageous feature of this structure furthermore consists of the absence of active components in supply bar 4, something that promotes failure safety. Supply bar 4 furthermore can be made as a contact element without electromechanical contacts.

The system's control device is furthermore preferably so designed that it would include a physical parameter, which makes it possible to determine the number of the bus subscriber modules that are set upon the coil or the electrode. The system's control device is furthermore designed so that it would comprise a physical parameter that makes it possible to determine the position in the main extension direction X of the bus subscriber modules that are set upon the coil or the electrode.

Another advantageous feature is to be emphasized here: According to the preferred, but not compulsory, design of the invention, commercially available mounting rails 1 can be stocked with the energy and data transmission devices 4.

While in accordance with the provisions of the Patent Statutes the preferred forms and embodiments of the invention have been illustrated and described, it will be apparent to those skilled in the art that changes may be made without deviating from the invention described above.

The invention claimed is:

1. A method for supplying electrical energy and data signals in a contact-free manner to a subscriber module, comprising the steps of:
(a) providing a horizontal mounting rail containing a longitudinal chamber;
(b) arranging a supply bar longitudinally in said chamber, said supply bar having at least one primary energy and data interface;

(c) mounting at least one bus subscriber module transversely on said mounting rail above said supply bar, said module having at least one secondary energy and data interface for receiving signals transmitted in a contact-free manner by said at least one primary energy and data interface, respectively;

(d) determining the absolute position of the bus subscriber module on the mounting rail;

(e) determining the number of modules set upon the mounting rail as a function of at least one determinable critical parameter during the transmission of the energy and/or data signal; and (f) re-adjusting the system as a function of the number of bus subscriber modules set upon the mounting rail, wherein said system readjustment is achieved by at least one of variation in the level of the bus bar voltage.

2. A method for supplying electrical energy and data signals in a contact-free manner to a subscriber module, comprising the steps of:

(a) providing a horizontal mounting rail containing a longitudinal chamber;

(b) arranging a supply bar longitudinally in said chamber, said supply bar having at least one primary energy and data interface;

(c) mounting at least one bus subscriber module transversely on said mounting rail above said supply bar, said module having at least one secondary energy and data interface for receiving signals transmitted in a contact-free manner by said at least one primary energy and data interface, respectively; and (d) determining the absolute position of the bus subscriber module on the mounting rail wherein said position determination is effected by at least one of voltage variations measured at the secondary side, frequency-responsive resonance detection on the primary side, and frequency-responsive resonance detection on the secondary side.

3. The method as defined in claim 2, wherein a plurality of said bus subscriber modules are mounted transversely on said support member in parallel longitudinally-spaced relation above said supply bar, each of said modules having at least one secondary energy and data interface for receiving signals transmitted in a contact-free manner by said at least one primary energy and data interface, respectively.

* * * * *